(12) United States Patent
Snyder

(10) Patent No.: US 6,969,799 B2
(45) Date of Patent: Nov. 29, 2005

(54) POKE THROUGH

(75) Inventor: Darryl L. Snyder, Canton, OH (US)

(73) Assignee: SGC Technologies, L.L.C., Canton, OH (US)

( * ) Notice: Subject to any disclaimer, the term of this patent is extended or adjusted under 35 U.S.C. 154(b) by 33 days.

(21) Appl. No.: 10/991,720

(22) Filed: Nov. 18, 2004

(65) Prior Publication Data

US 2005/0109523 A1 May 26, 2005

Related U.S. Application Data

(60) Provisional application No. 60/523,543, filed on Nov. 20, 2003.

(51) Int. Cl.[7] .................................................. H02G 3/04
(52) U.S. Cl. ..................... 174/48; 174/49; 174/77 R; 174/72 R; 52/220.8
(58) Field of Search ......................... 174/48, 50, 49, 174/77 R, 72 R, 95; 52/220.1, 220.8, 220.5, 52/220.7; 285/136.1, 189

(56) References Cited

U.S. PATENT DOCUMENTS

| 343,025 | A | 6/1886 | Gordon |
|---|---|---|---|
| 403,564 | A | 5/1889 | Sullivan |
| 641,580 | A | 1/1900 | Cummins |
| 1,776,656 | A | 9/1930 | Frederickson |
| 1,992,574 | A | 2/1935 | Jenkins |
| 3,460,322 | A | 8/1969 | Rivers |
| 3,740,934 | A | 6/1973 | Shuler |
| 4,020,875 | A | 5/1977 | Akiba |
| 4,174,126 | A | 11/1979 | Hauff |
| 4,429,497 | A | 2/1984 | Dibernardi |
| 4,467,914 | A | 8/1984 | Trammel |
| 4,607,469 | A | 8/1986 | Harrison |
| 4,711,160 | A | 12/1987 | Witten |
| 4,712,342 | A | 12/1987 | Legerius |
| 4,765,375 | A | 8/1988 | Nakajima |
| 4,773,197 | A | 9/1988 | Sullivan |
| 4,817,348 | A | 4/1989 | Wydra |
| 4,858,520 | A | 8/1989 | Prochnow |
| 4,967,524 | A | 11/1990 | Hull |
| 5,393,930 | A * | 2/1995 | Wuertz ..................... 174/48 |
| 5,421,775 | A | 6/1995 | Honda |
| 5,729,938 | A | 3/1998 | Tobias |
| D394,901 | S | 6/1998 | Governale |
| 5,813,706 | A | 9/1998 | Travis |
| 6,018,126 | A * | 1/2000 | Castellani et al. ............ 174/48 |
| 6,024,127 | A | 2/2000 | Johnson |
| 6,125,593 | A | 10/2000 | Randolph |
| 6,353,180 | B1 * | 3/2002 | DeBartolo et al. ............ 174/48 |
| 6,470,635 | B2 * | 10/2002 | Cornwall ................... 52/220.8 |
| D465,276 | S | 11/2002 | Snyder |
| 6,495,753 | B1 * | 12/2002 | Goodsell et al. ............. 174/48 |
| 6,518,498 | B1 * | 2/2003 | Bonilla et al. ................ 174/48 |

* cited by examiner

Primary Examiner—Dhiru R. Patel
(74) Attorney, Agent, or Firm—Zollinger & Burleson Ltd.

(57) ABSTRACT

A poke through includes a tube assembly having inner and outer tube sections that are slidably telescopically disposed together. A lip protrudes from the outer end of at least one of the tube sections. A cup is selectively and removably disposed on one of the tube sections. The cup has a body plate and a flange. A portion of the lip on the tube section on which the cup is disposed engages the front surface of the body plate. In one embodiment, an adjustable plug has a plurality of selectively removable rings. The adjustable plug fits inside one of the tube sections to seal and insulate the poke through both before and after the poke through is in use.

22 Claims, 24 Drawing Sheets

POKE THROUGH

CROSS REFERENCE TO RELATED APPLICATIONS

This application claims priority from U.S. Provisional Patent Application Ser. No. 60/523,543 filed Nov. 20, 2003; the disclosures of which are incorporated herein by reference.

BACKGROUND OF THE INVENTION

1. Technical Field

The present invention generally relates to poke throughs and, more particularly, to poke throughs used to run wires, pipes, and the like through a wall in a building.

2. Background Information

There are numerous applications where wires, pipes, and the like must be run through a wall or a foundation in a building or other structure. These applications include electrical cables, phone wires, computer wires, cable TV wires, water pipes, and the like. Another application is where air conditioner line sets are run from the outside to the inside of a structure. For instance, a residential air conditioner includes a condenser unit disposed outside of the house with a heat exchanger and blower disposed on the inside of the house. A refrigerant line must run from the condenser outside of the house through a wall, to the heat exchanger, and back through the wall to the condenser. The run from the condenser to the heat exchanger is insulated with a thick foam insulation material that keeps the refrigerant in the line cool and prevents condensation. An electrical wire is typically run with these two refrigerant pipes. The combination of the three pipes is typically referred to as a "line set" in the art. These line sets are passed through the foundation wall of houses wherein the heat exchanger is located in the basement of the house. The line set also may be disposed directly through the wall of the house when the heat exchanger is disposed on the first floor of the house in an appliance closet. In both of these situations, a need exists in the art for a poke through that allows the line set to pass through the wall or foundation in an aesthetically desirable manner while also preventing openings from existing around the line set.

Various poke throughs are known in the art including those disclosed in U.S. Pat. Nos. 4,174,126, 4,773,197, 4,607,469, 4,712,342, and 4,967,524. Although these devices are known in the art, room remains for improvement in the art especially where the poke throughs are used with air conditioner line sets. One problem specific to air conditioner line sets is that of maintaining the integrity of thick foam insulation layer that surrounds one of the line set refrigerant pipes. This insulation should remain intact after the line set is installed. Unfortunately, many installers tear the insulation when they fish the line set through the opening in the wall. Torn insulation exposes the cold refrigerant line to the humid air causing condensation on the cold line. The condensation will eventually drip and may cause water damage. In addition, torn insulation will lower the efficiency of the air conditioning unit. The art thus desires a poke through for an air conditioner line set that allows the line set with the insulated refrigerant line to be pulled through the poke through. The art also desires a poke through that is easy to seal after the line set is installed. The art further desires a poke through that may be sealed tightly to different outer and inner surfaces of the wall through which with it is used. The poke through should also be adjustable in length so that it may be used with a variety of walls. In addition, the poke through should be capable of being used with different types of walls and wall coverings.

BRIEF SUMMARY OF THE INVENTION

The invention provides a poke through that provides an aesthetically pleasing appearance from the inside and outside of the wall where the poke through is located.

The invention provides one embodiment of a poke through that may be used with an air conditioning line set. A poke through of the invention provides rounded corners that allow the air conditioning line set to be pulled through the poke through without tearing the insulation layer.

One embodiment of the invention provides a poke through set that may be selectively configured to be used with walls covered with masonry or siding. The poke through may be sealed to prevent air and water leaks. An adjustable plug is used to seal the interior of the poke through both before and after the poke through is in use. In one embodiment, the invention has an adjustable length with at least one finger that frictionally maintains the adjusted length.

Another embodiment of the invention provides two spaced fingers that frictionally maintain the adjusted length. The location and spacing of the fingers allow the poke through to be configured in long and short configurations.

BRIEF DESCRIPTION OF THE SEVERAL VIEWS OF THE DRAWINGS

FIG. 3 is an exploded view of the second configuration of the poke through.

FIG. 20 is a section view showing a third configuration of the poke through.

Similar numbers refer to similar parts throughout the specification.

DETAILED DESCRIPTION OF THE INVENTION

Figure 1:
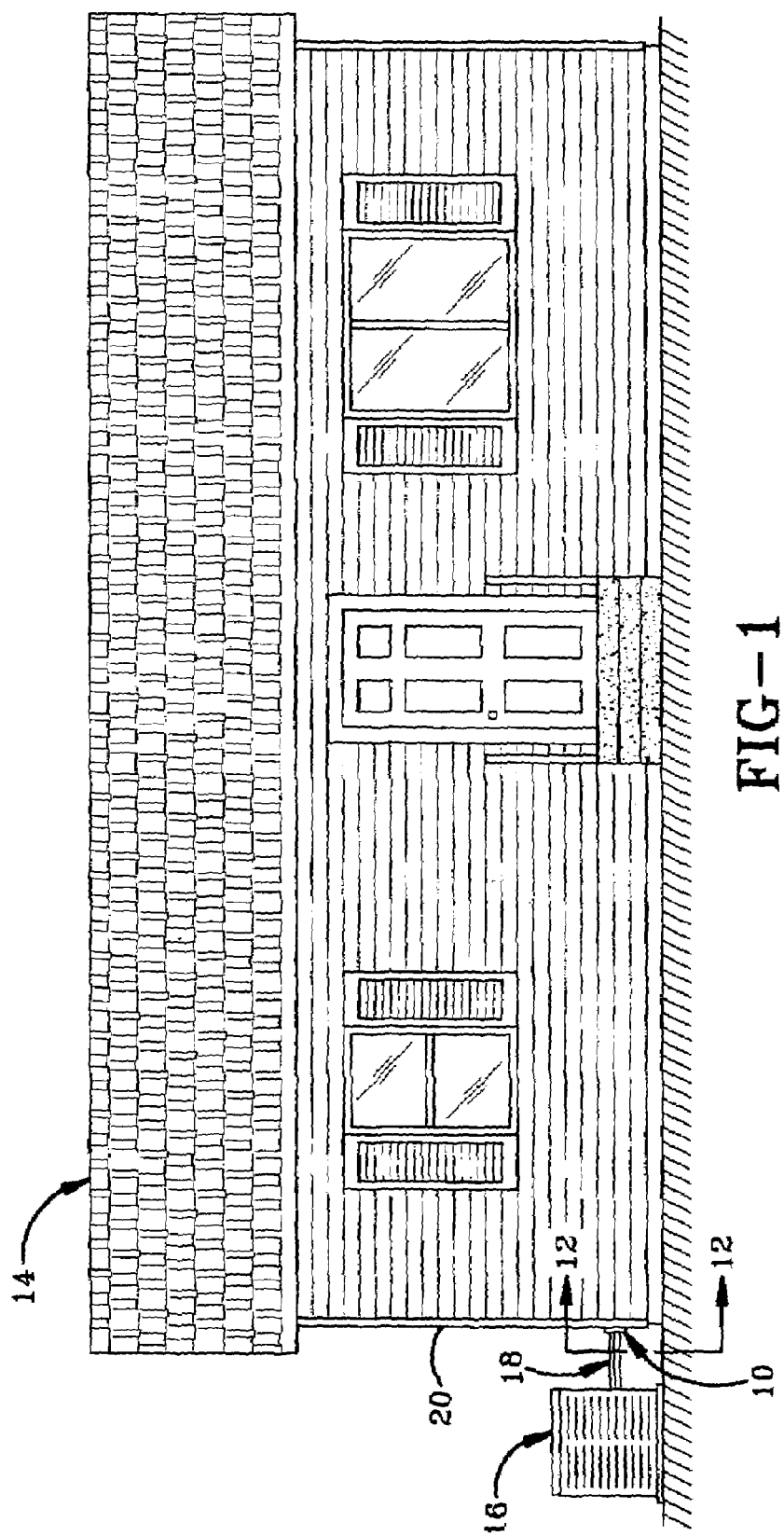
FIG. 1 is a front view of a building showing an air conditioner condenser unit disposed outside the building with the line set of the air conditioning unit running through a wall of the building.

A first embodiment of the poke through of the present invention is depicted in different configurations in FIGS. 1–20. A first configuration of the poke through of the present invention is indicated generally by the numeral 10 and a second configuration of the poke through of the present invention is indicated generally by the numeral 12 in the drawings. Each configuration 10 and 12 uses a combination of different parts with many of the parts being used in each configuration 10 and 12.

A building 14 that uses poke through 10 is depicted in FIG. 1. Building 14 has an air conditioner condenser 16 disposed outside of building 14 with an air conditioner line set 18 extending from condenser 16 through a wall 20 of building 14. Poke through 10 is installed in wall 20 so that the person installing line set 18 may easily install line set 18 without tearing the insulation layer of line set 18. Poke through 10 also seals the opening in wall 20 to prevent undesirable elements from entering building 14. Poke through 10 provides a finished appearance to the area of wall 20 where line set 18 passes through wall 20. Poke through 10 may be used with any of a variety of wires, cables, pipes, tubes, and the like.

Figure 2:
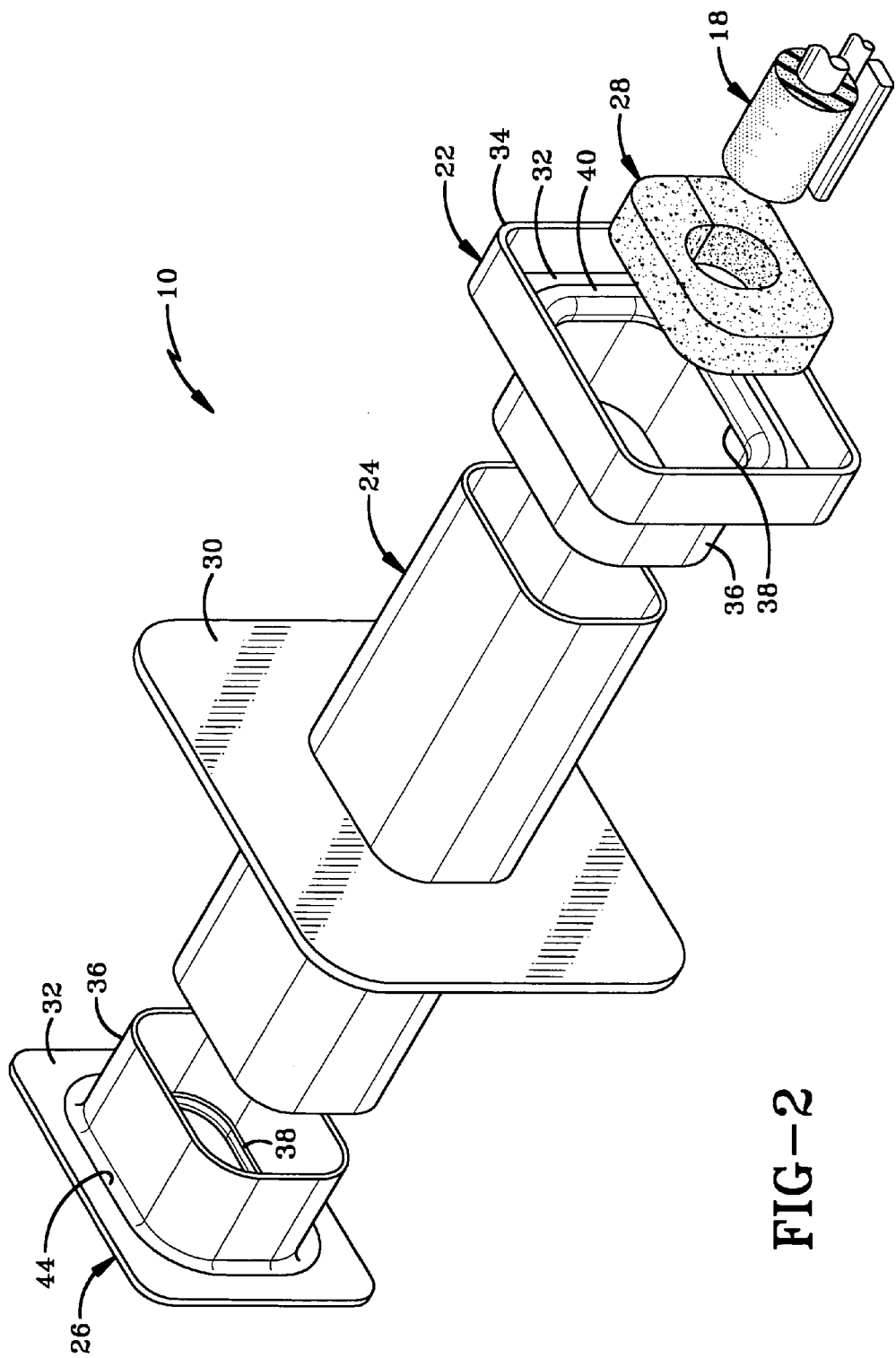
FIG. 2 is an exploded view of a first configuration of the poke through of the invention.
Figure 3:
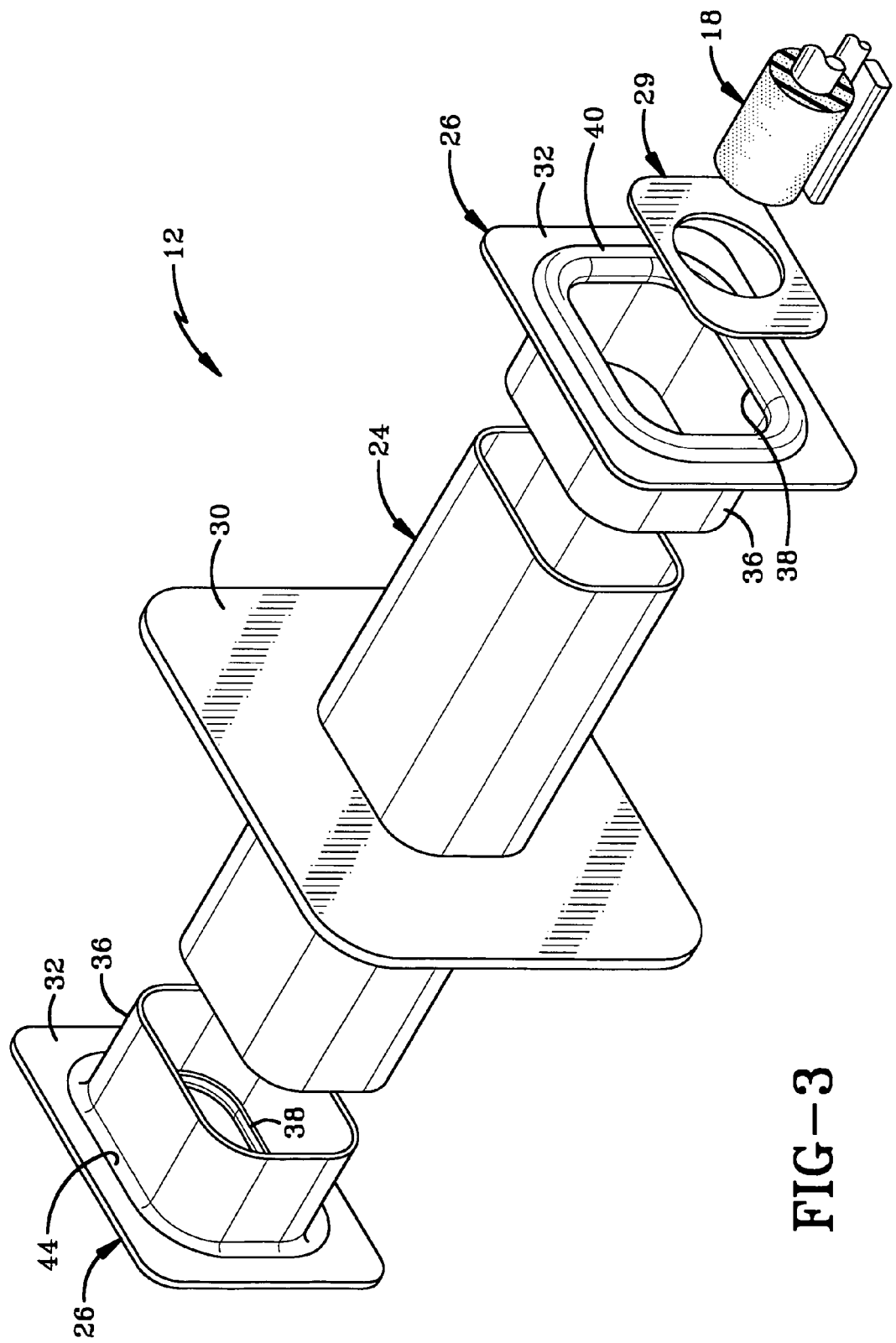
Figure 4:
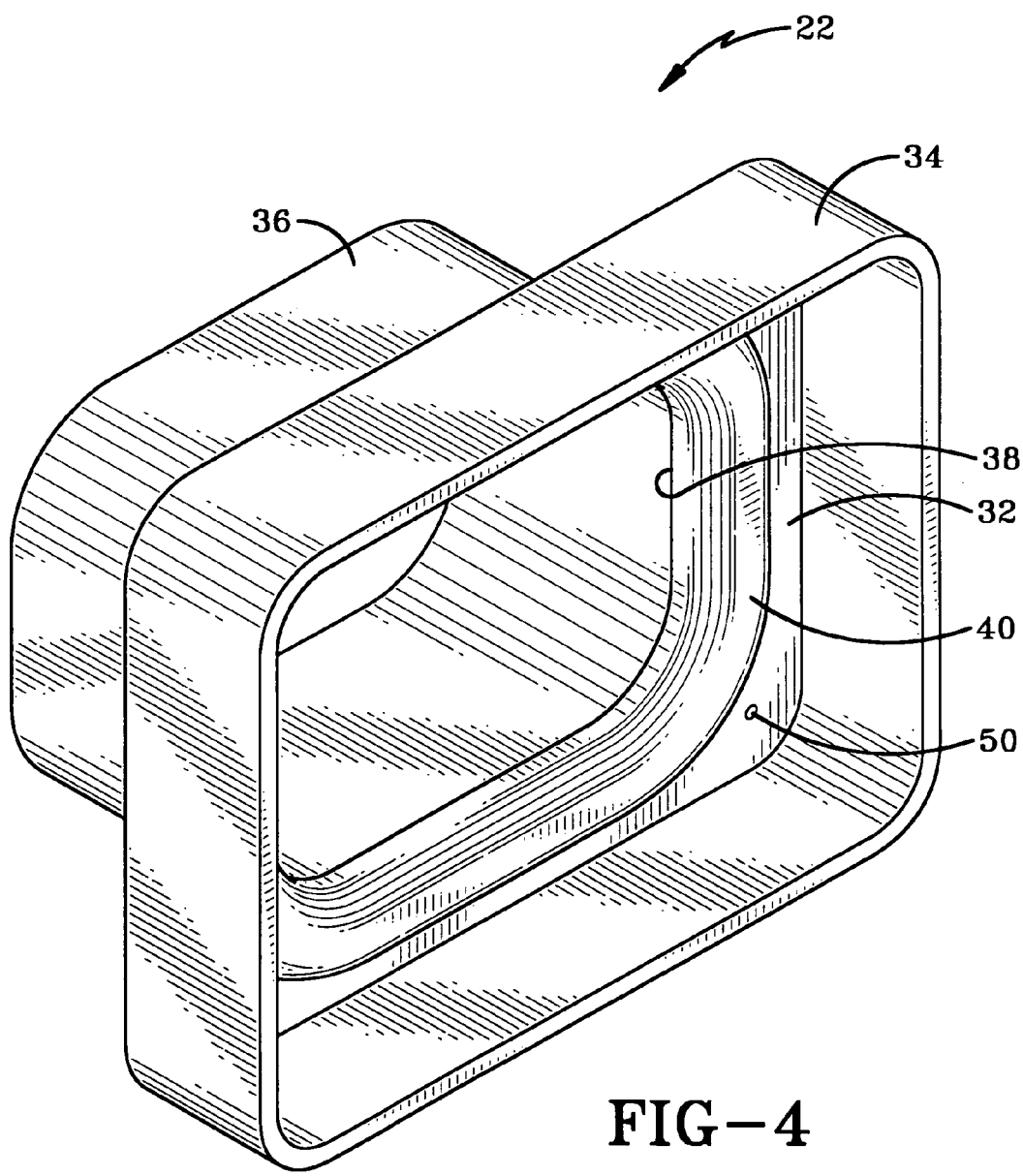
FIG. 4 is a perspective view of one of the end caps of the poke through of the invention.
Figure 5:
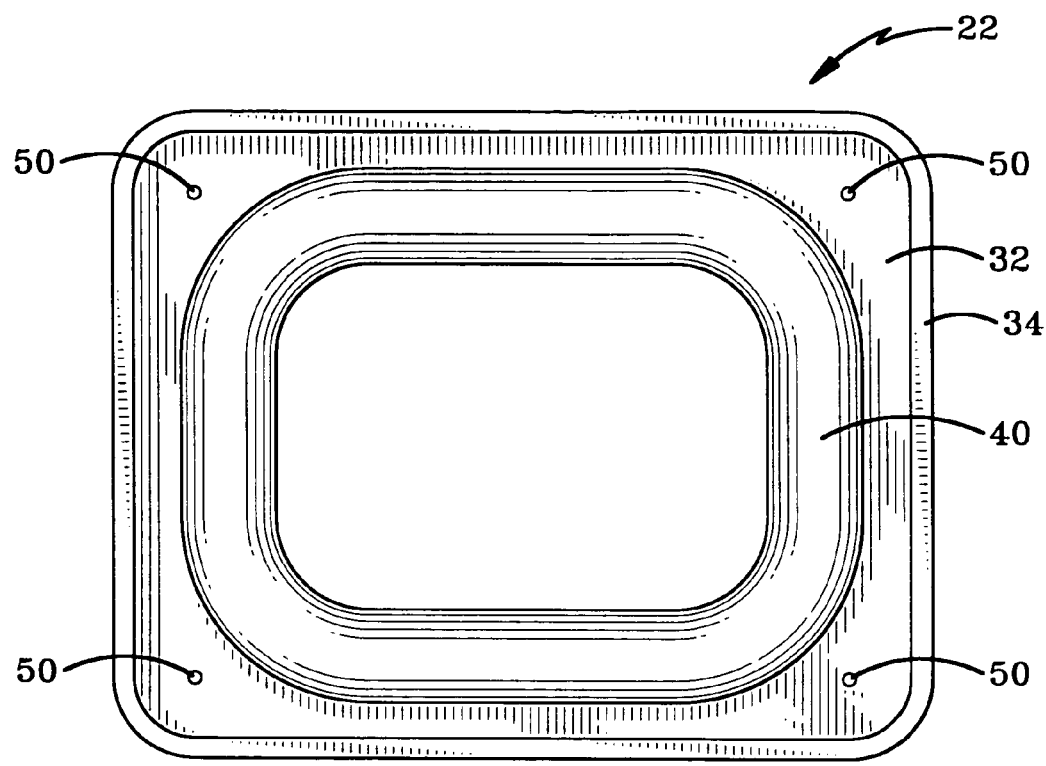
FIG. 5 is a front view of FIG. 4.
Figure 6:
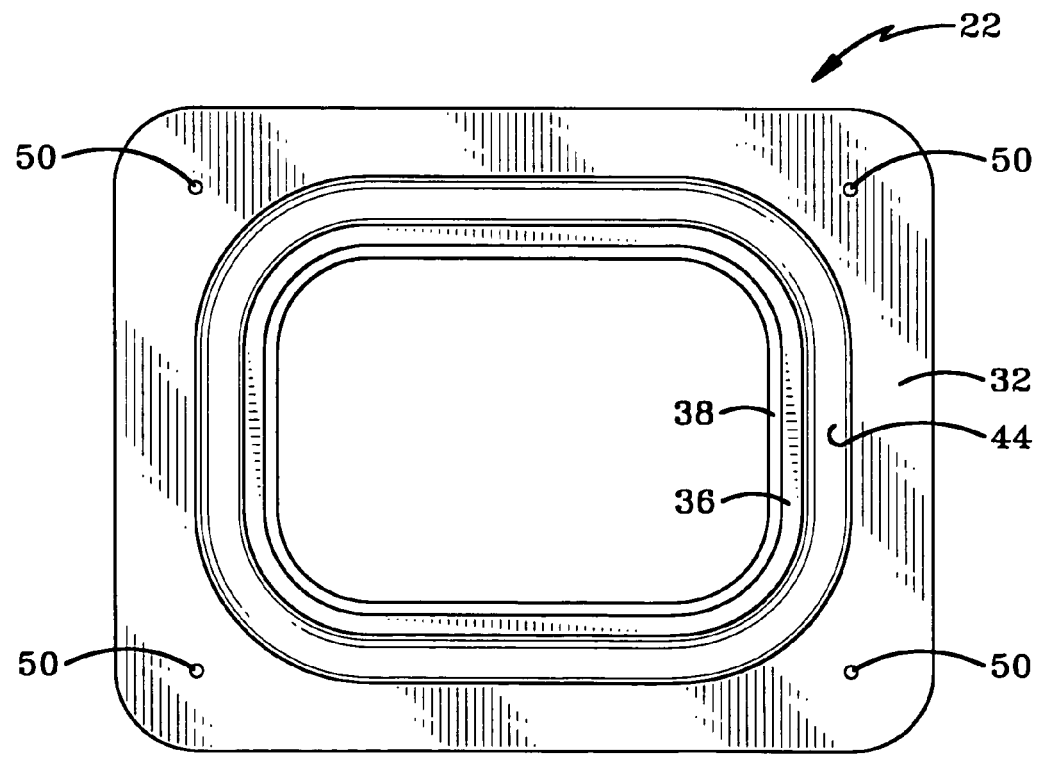
FIG. 6 is a rear view of FIG. 4.
Figure 7:
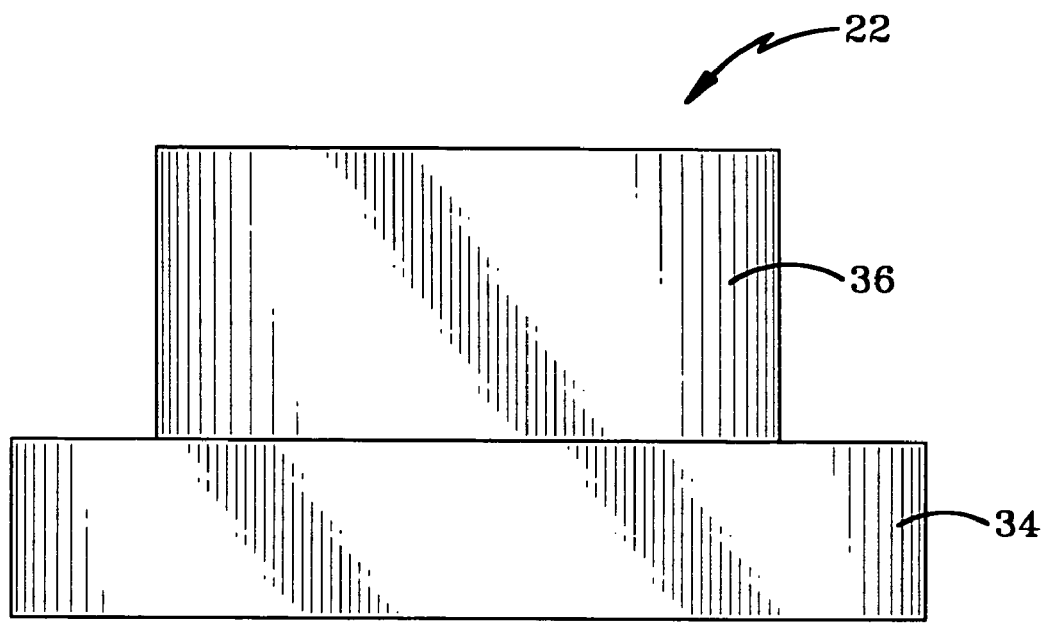
FIG. 7 is a top view of FIG. 4.
Figure 11:
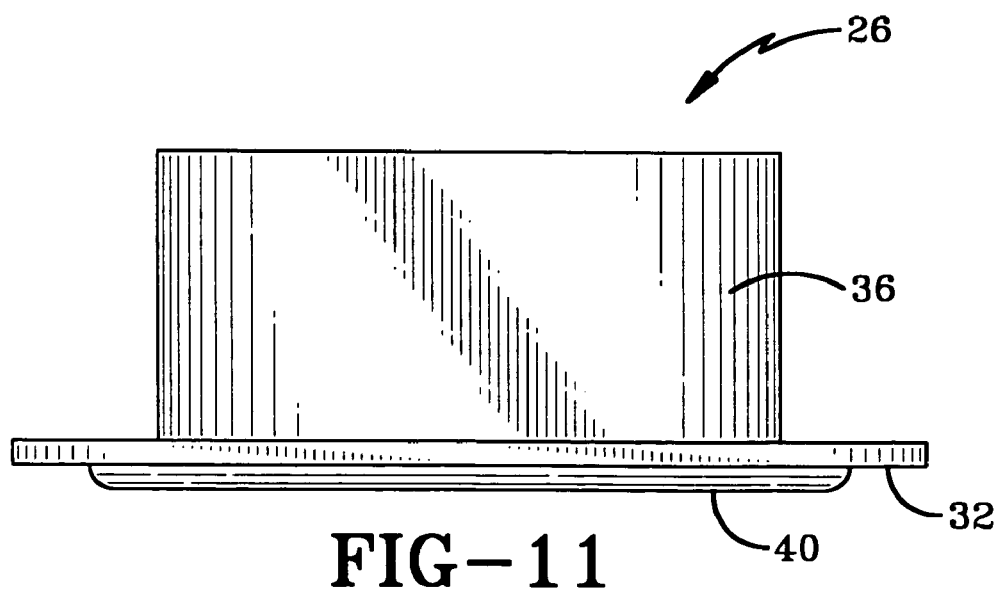
FIG. 11 is a top view of FIG. 8.
Figure 8:
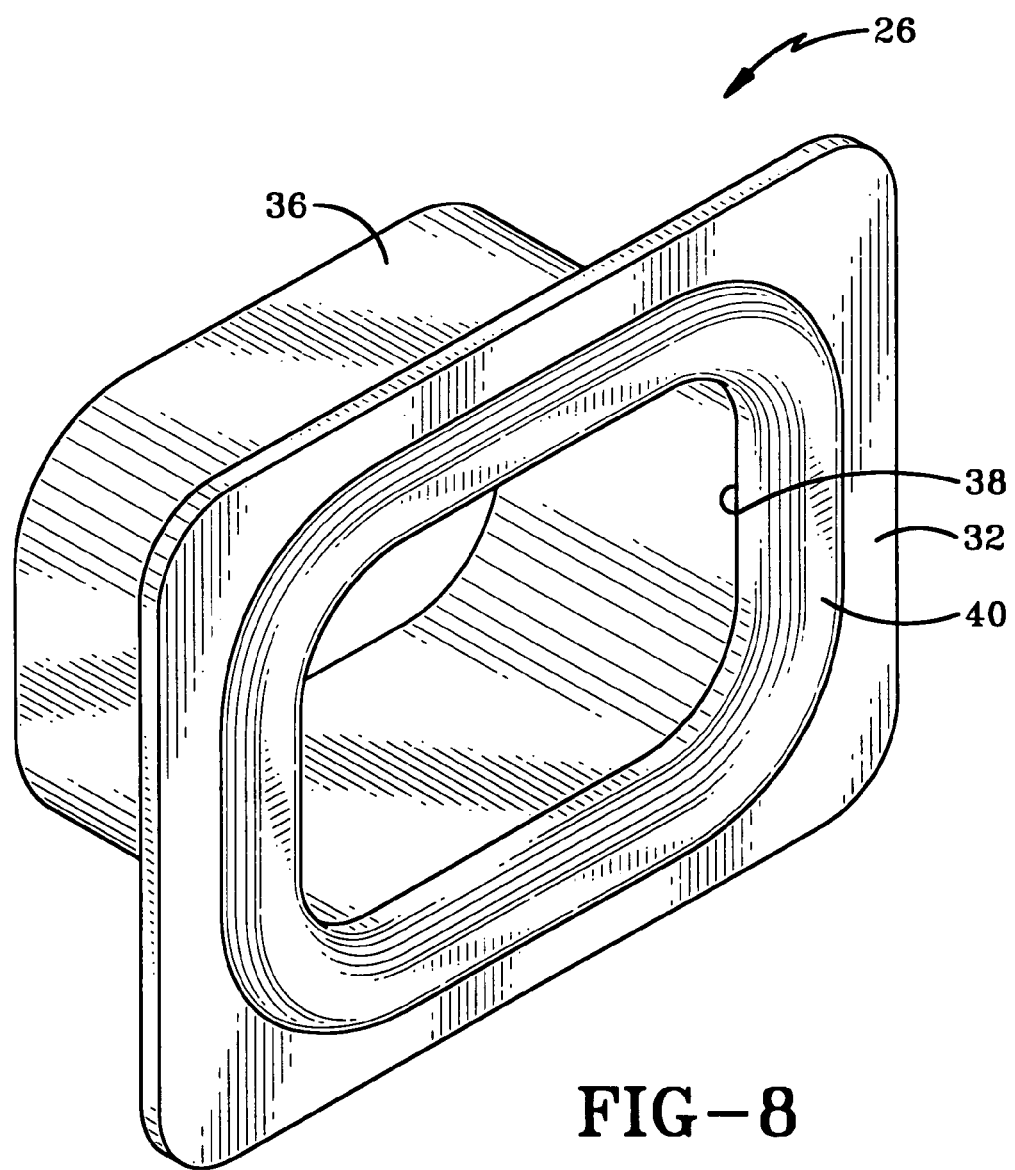
FIG. 8 is a perspective view of the other end cap of the poke through of the invention.
Figure 9:
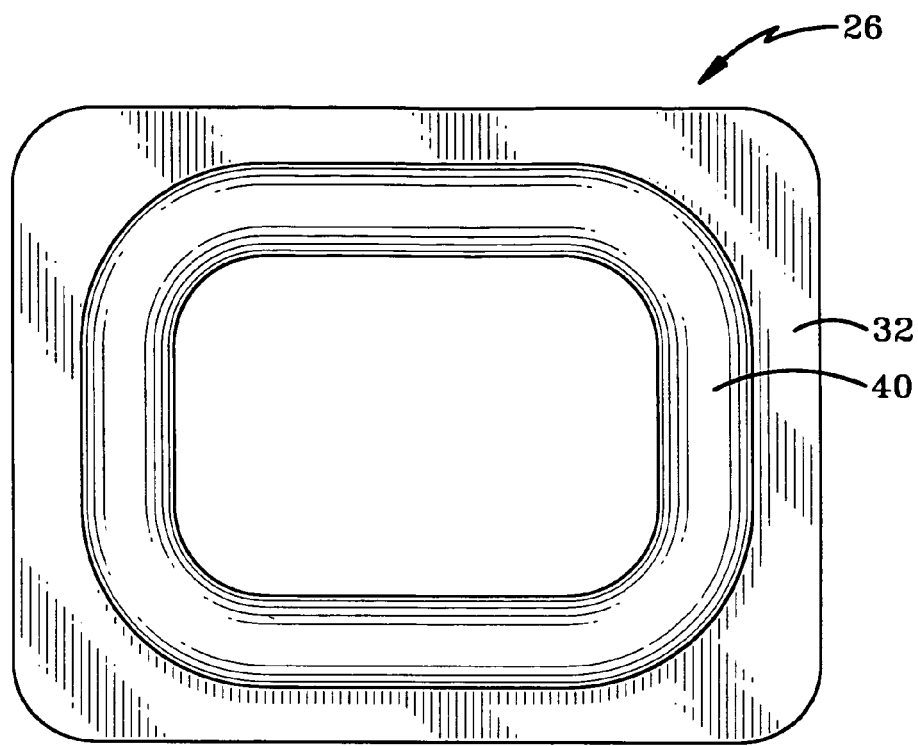
FIG. 9 is a front view of FIG. 8.
Figure 10:
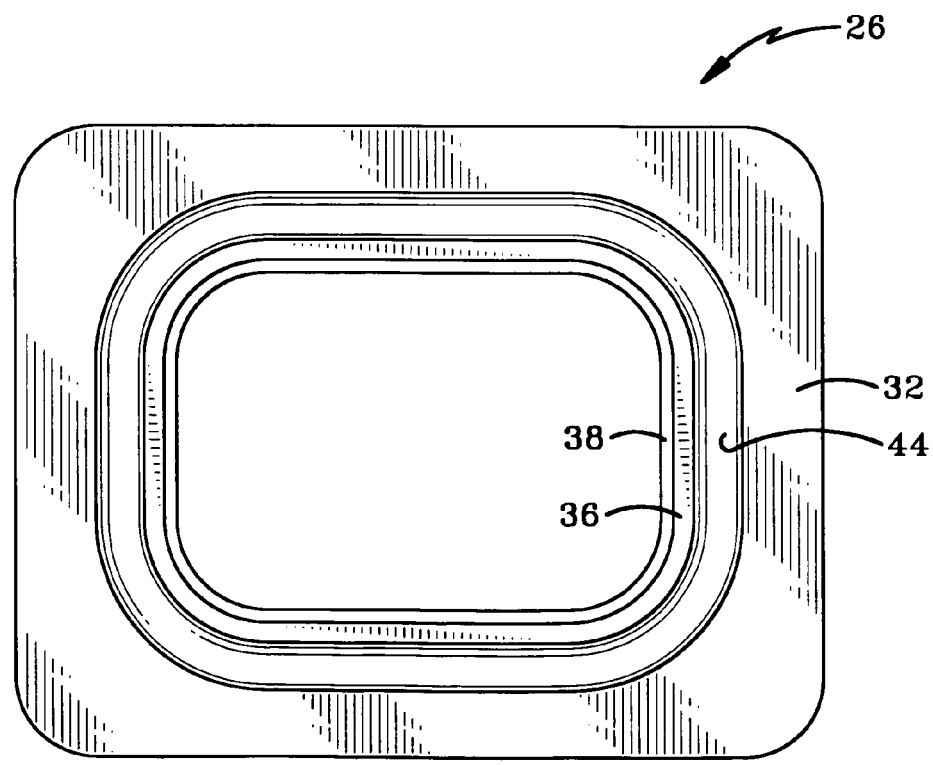
FIG. 10 is a rear view of FIG. 8.

An exploded view of first configuration 10 is depicted in FIG. 2. First poke through configuration 10 includes a first end assembly 22, a tube 24, and a second end assembly 26. The elements of assemblies 22 and 26 described below may be integrally formed or formed in individual components. First poke through configuration 10 may also include a plug 28 and a mounting plate 30. Second poke through configuration 12 is shown in FIG. 3 wherein a pair of second end assemblies 26 are used with tube 24 to form second configuration 12. Second configuration 12 is shown with a cover 29. The parts of these configurations may be interchanged such that first configuration 10 may use cover plate 29 and second configuration 12 may use plug 28. A third configuration may be assembled from a pair of first end assemblies 22. Either configuration 10 or 12 may be positioned horizontally or vertically with respect to the structure in which it is used. The exemplary drawings show the poke through being used with a vertical wall but it may also be used with a horizontal floor.

Figure 13:
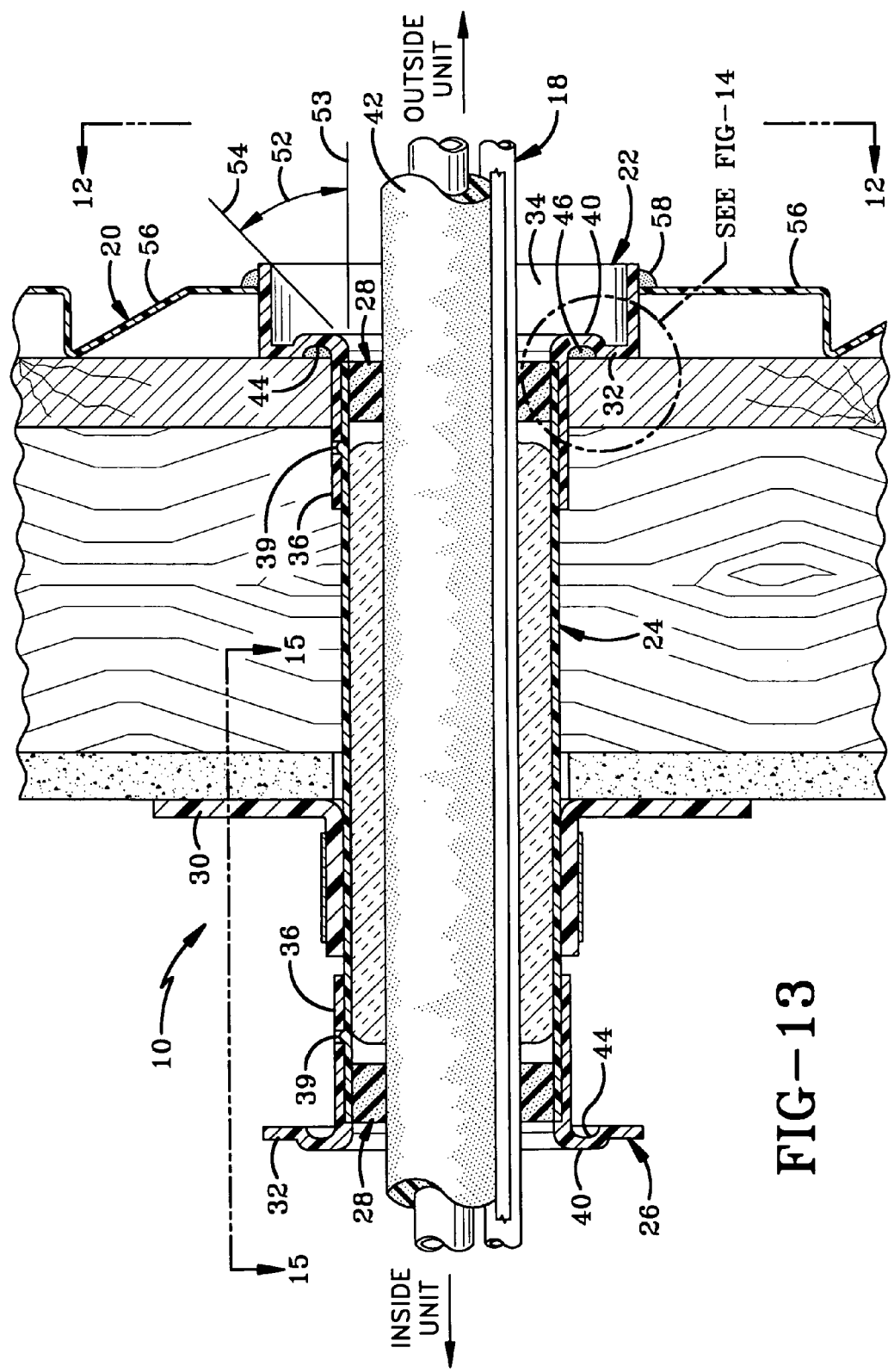
FIG. 13 is a section view taken along line 13—13 of FIG. 12.
Figure 14:
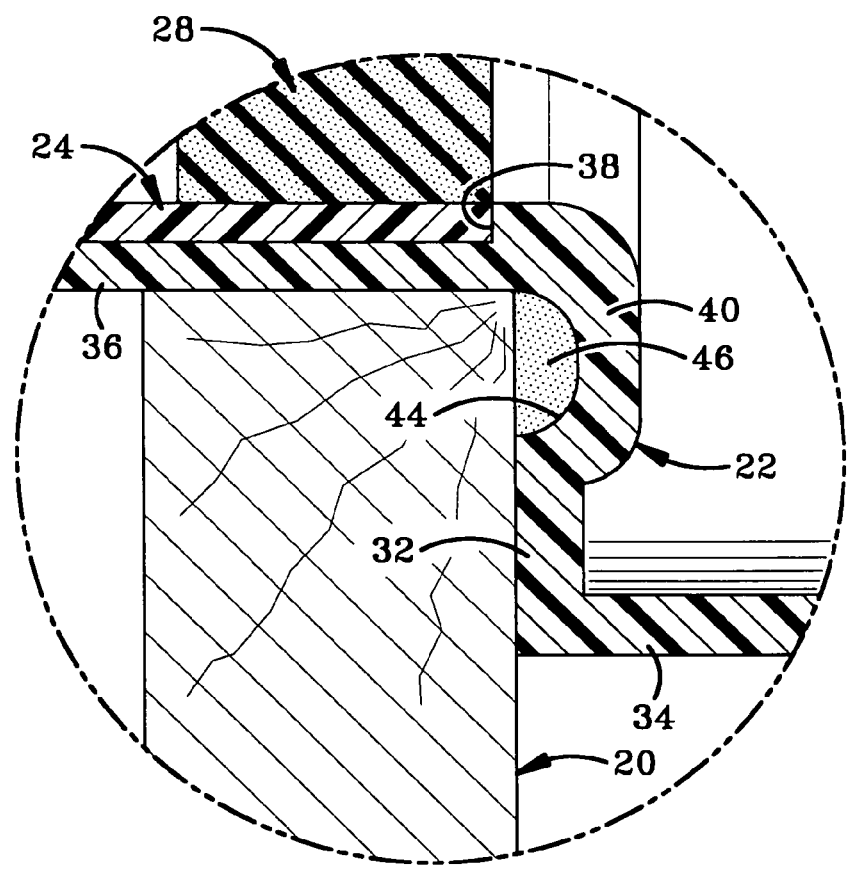
FIG. 14 is an enlarged view of the encircled portion of FIG. 13.
Figure 15:
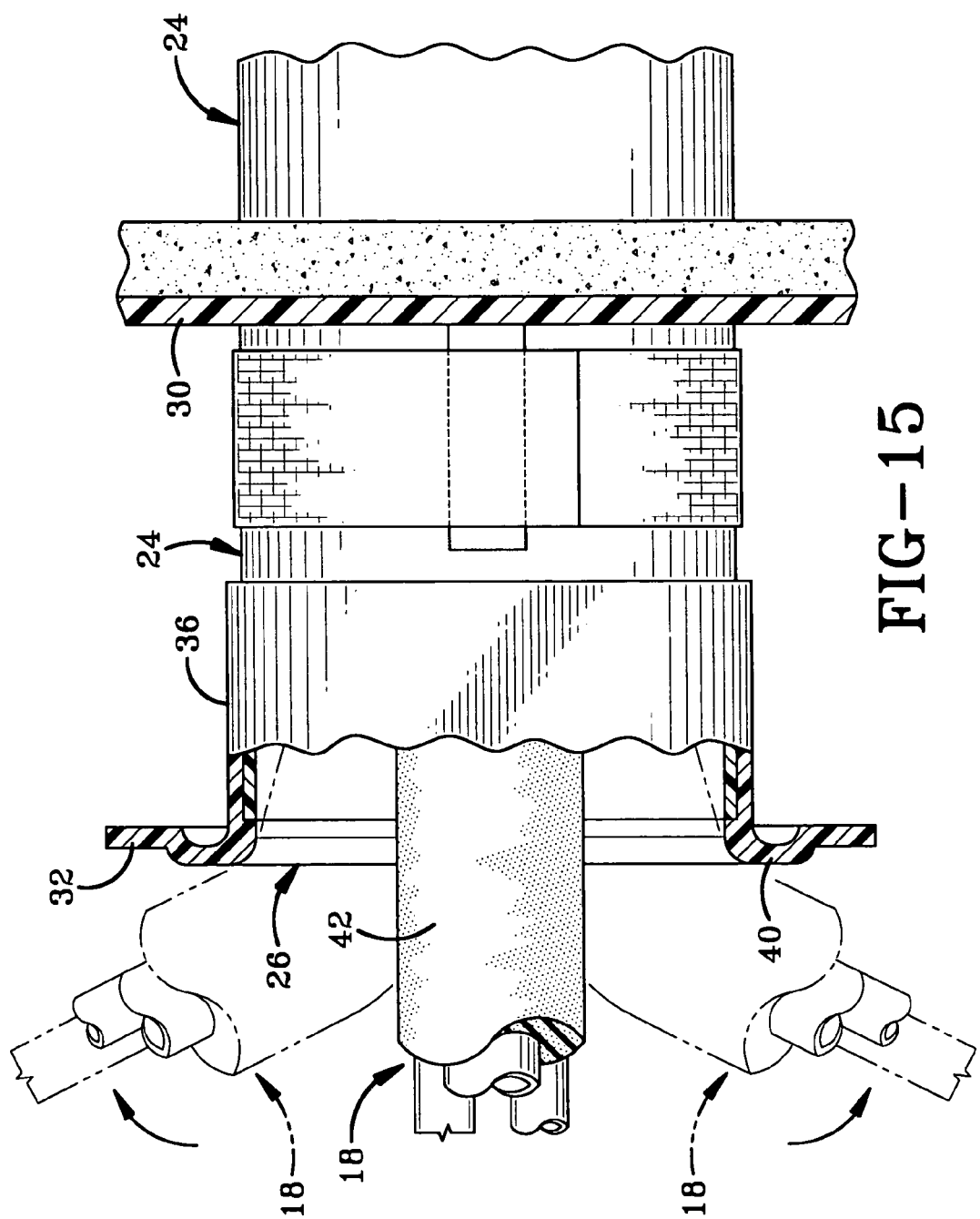
FIG. 15 is a section view taken along line 15—15 of FIG. 13 showing how a line set may be pulled through the poke through of the invention.
Figure 16:
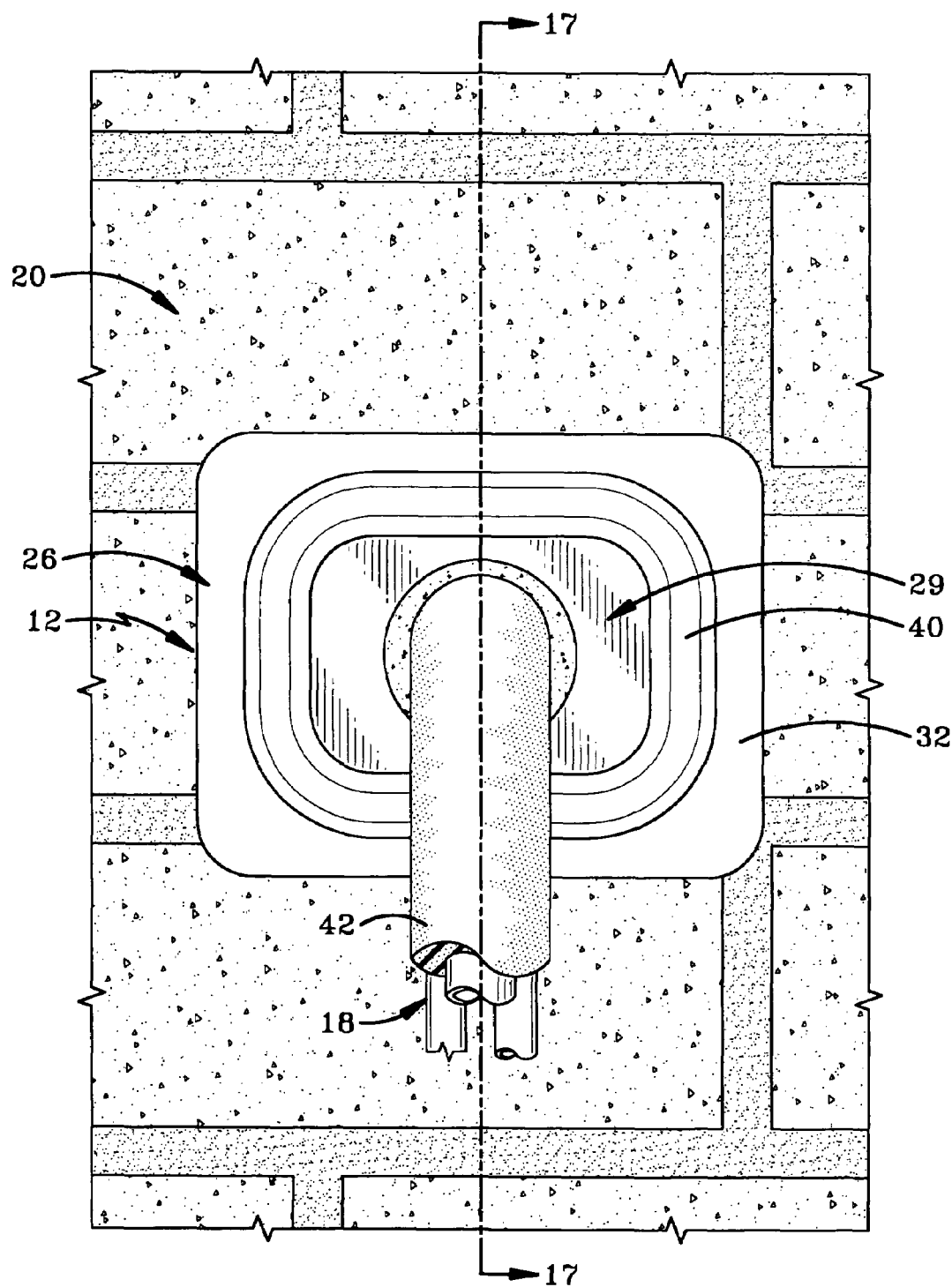
FIG. 16 is a view similar to FIG. 12 showing a second configuration of the poke through of the invention.
Figure 17:
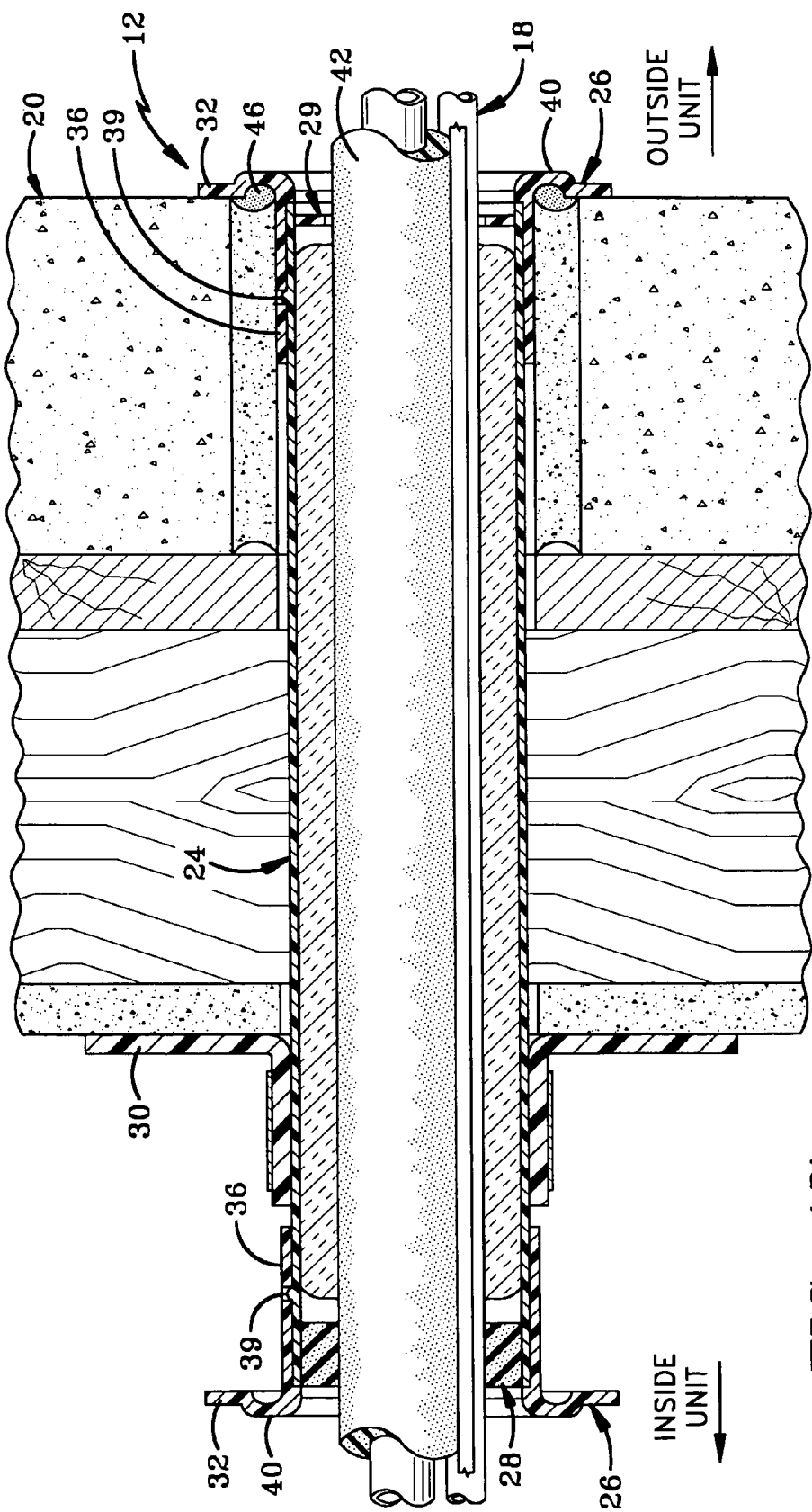
FIG. 17 is a section view taken along line 17—17 of FIG. 16.
Figure 18:
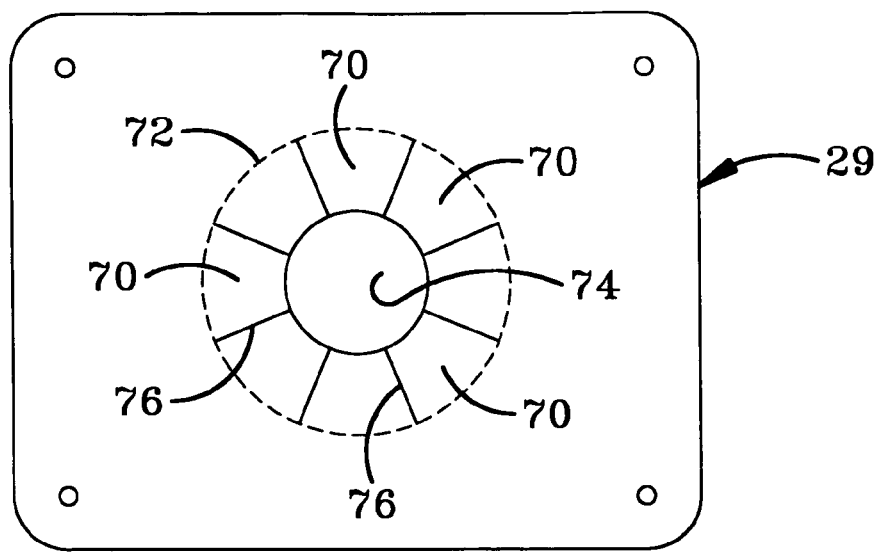
FIG. 18 is a front elevation view of an alternative cover used with the poke through of the present invention.

The structure of first end assembly 22 is shown in FIGS. 4–7. Second end assembly 26 is shown in FIGS. 8–11 and is similar to first end assembly 22 other than the lack of the flange 34. First end assembly 22 has a body that includes a body plate 32 with an outer flange 34 projecting outwardly and forwardly (forward with respect to the structure in which it will be used) from the outer perimeter of body plate 32. In the context of this application, the body plate is the portion of the body disposed inside flange 34. Other portions of the body may extend outwardly from flange 34. A coupling flange 36 projects rearwardly from the rear of body plate 32. Flange 36 is sized to slide over either end of tube 24 to connect first end assembly 22 to tube 24. Flange 36 is spaced from the inner perimeter of the opening defined by body plate 32 to form a step 38 having a height equal to the wall thickness of tube 24 so that a smooth transition between tube 24 and first end assembly 22 is formed as shown in FIG. 14. Tube 24 may be securely taped to flange 36, adhered to flange 36, or connected with appropriate fasteners. Tube 24 may also be connected to flange 36 with a restraining protuberance such as the snap-fit button 39 shown in FIGS. 13 and 20.

A rounded lip 40 projects forwardly from body plate 32 at the perimeter of the opening defined by body plate 32. Rounded lip 40 provides a smooth, rounded corner over which line set 18 may be pulled when a worker is fishing line set 18 through poke through 10. Lip 40 is continuous and is free of sharp edges or corners that would snag the insulation 42 of line set 18. An open channel 44 is formed behind lip 40. Channel 44 may be used to receive an adhesive or sealant 46 that helps seal the opening through wall 20 and to connect end assembly 22 to wall 20. End assembly 22 may also be fastened to wall 20 with mechanical fasteners 48 such as nails, wood screws, or masonry screws. Body plate 32 may define notches or holes 50 that help start fasteners 48.

Outer flange 34 extends substantially perpendicularly to body plate 32 and is continuous about the outer perimeter of first end assembly 22. Outer flange 34 has a height that is short enough to not interfere with line set 18 when line set 18 is being pulled through, or pushed through, first end assembly 22. In order to avoid interference, the height of outer flange 34 is designed such that an acute angle 52 of greater than 40 degrees is formed between a longitudinal reference line 53 and a reference line 54 as shown in FIG. 13. Reference line 53 is parallel to the longitudinal axis of flange 36. Reference line 54 is tangent to lip 40 and passes through the inner portion of the outer edge of flange 34. However, flange 34 must have a height that is large enough to extend past siding 56 disposed on the outside of wall 20. As such, outer flange 34 has a height of at least one inch or 2.54 cm. When first end assembly 22 is installed on a sided wall 20, siding 56 is cut to allow a space for first end assembly 22. The opening cut in siding 56 snugly receives first end assembly 22 to provide a desirable appearance and to stop water from directly attacking wall 20. A bead of sealant 58 may be used to seal the connection between siding 56 and flange 34.

Figure 12:
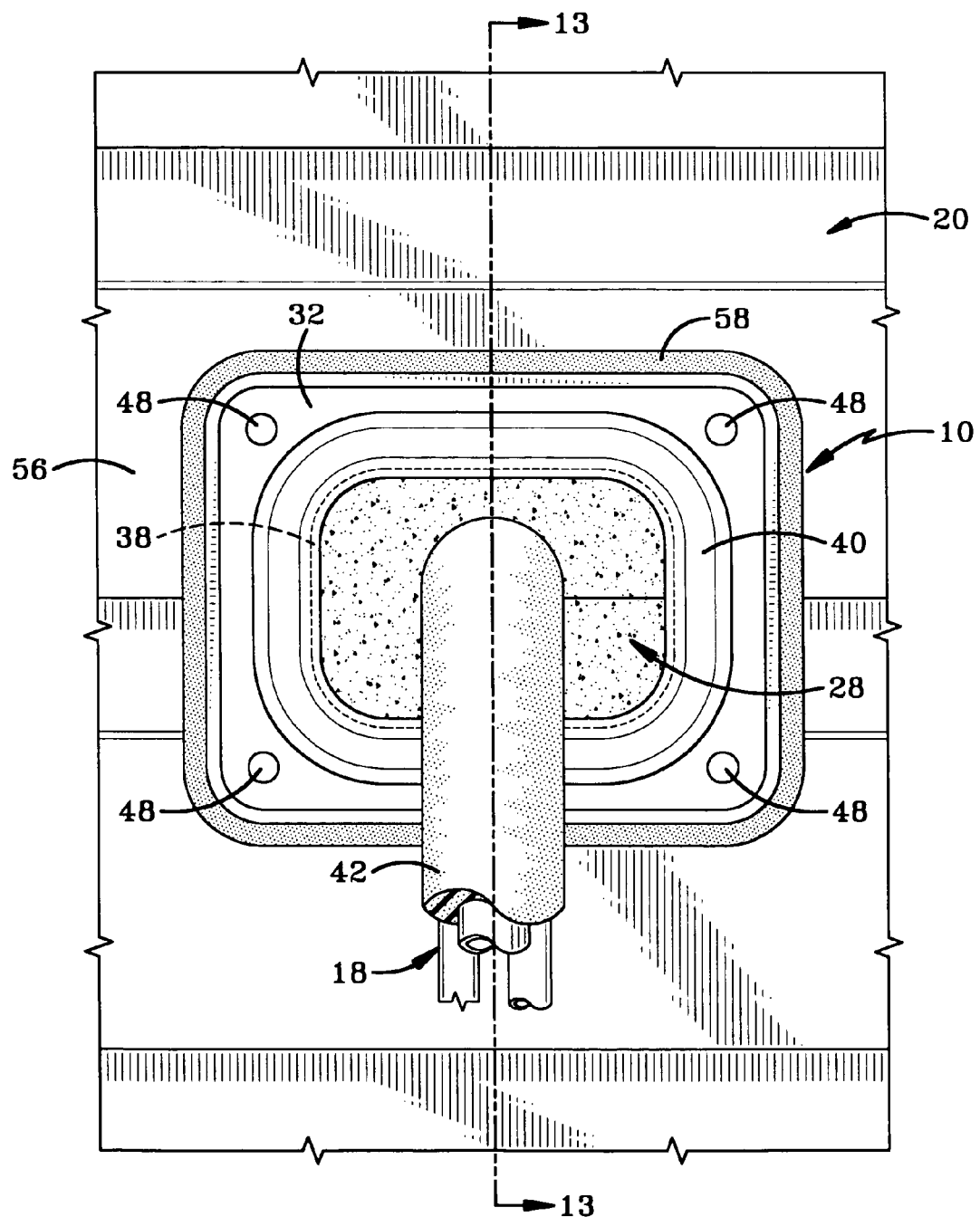
FIG. 12 is a section view taken along line 12—12 of FIG. 1.
Figure 28:
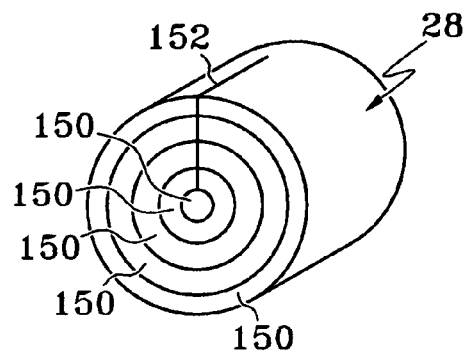
FIG. 28 is a view of an adjustable plug that may be used with either of the poke through embodiments of the invention.

Plug 28 is used inside first end assembly 22 or second end 26 to help seal the space around line set 18 as shown in FIGS. 2, 12, and 13. Plug 28 is preferably fabricated from an insulating material such as a foamed polymer. Plug 28 is generally C-shaped including a longitudinal slit that extends from the interior opening to the exterior opening. The slit allows plug 28 to be opened and stretched around line set 18. Plug 28 is then slid into place where it is frictionally received within first end assembly 22 or second end 24. Plug 28 spaces line set 18 from ends 22,26 and tube 24. FIG. 13 additionally shows that the interior of tube 24 may be filled with an insulating material such as expanding aerosol insulation. The insulation may completely surround line set 18 because it is supported by plugs 28. One benefit to using plug 28 is a smooth, aesthetically-pleasing appearance to the exterior of poke through 10. The color of plug 28 may also be matched to the color of first end assembly 22 as well as siding 56 in order to help hide poke through 10. Another benefit is that plug 28 may be used to seal poke the through after the poke through is installed in a wall but before the lines or wires are run. When such a seal is desired, the interior opening of plug 28 may be filled with a removable filler plug such as that shown in FIG. 28. FIG. 28 also depicts an alternative plug that is adjustable by the person installing the plug. Both the exterior and interior dimensions may be changed by the user by selectively removing concentric layers.

Figure 19:
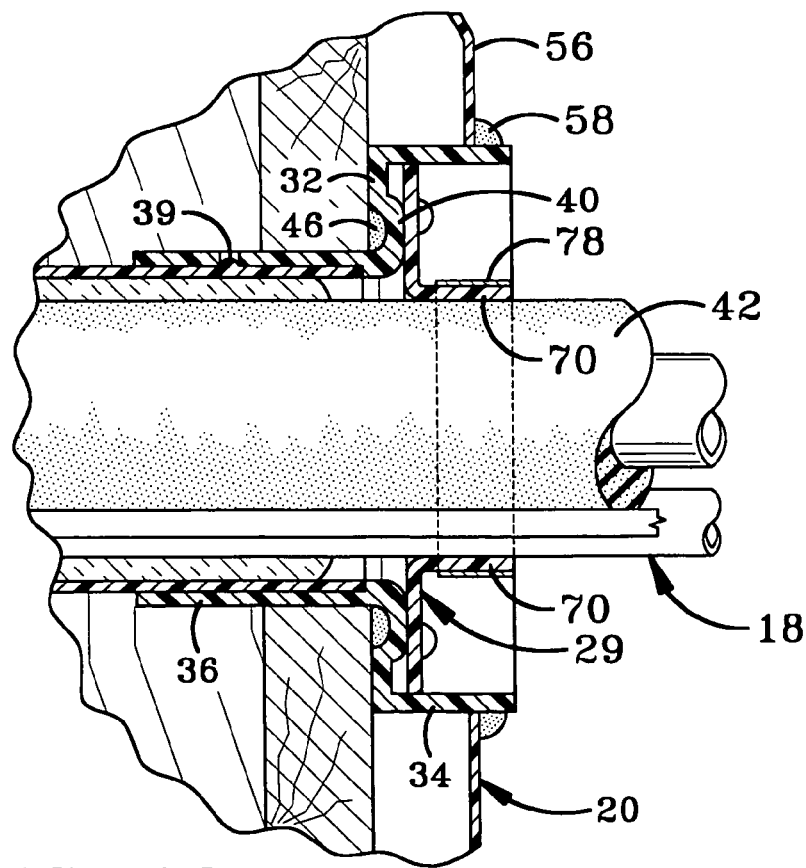
FIG. 19 is a section view showing how the alternative cover may be installed.

An alternative cover is shown in FIGS. 3 and 16–19 wherein a cover plate 29 is used around line set 18 to cover the opening that is disposed through poke through 10 or 12. Cover plate 29 may be used with or without plug 28. Cover plate may be configured to fit within the opening defined by second end assembly 26 or may be configured to fit snugly within flange 34 of first end assembly 22. Cover plate 29 may be fabricated from a corrugated polymer material and may be colored to match second end assembly 26 or first end assembly 22 as well as siding 56. Cover plate 29 may be held to second end assembly 26 with appropriate adhesives. In the embodiment depicted in FIG. 18, cover plate 29 is designed to cover lip 40 and be connected with fasteners that extend through cover plate 29 and into second end assembly 26. In the embodiment depicted in FIG. 18, cover plate 29 is designed to have an adjustable opening formed by a plurality of fingers 70 that extend between a scored line 72 and an inner opening 74. Slits 76 define each finger 70 and allow fingers 70 to be bent outwardly to accept a larger diameter line set as depicted in FIG. 19. Fingers 70 are then taped around line set 18 with a piece of tape 78.

Poke through 10 is installed by first connecting first end assembly 22 to tube 24 as depicted in FIG. 13. First end assembly 22 and tube 24 are then inserted into the opening formed in wall 20 such that the inner end of tube 24 is disposed within the room where line set 18 is to pass into building 14. The user then slides mounting plate 30 onto the inner end of tube 24 as shown in FIG. 13. The user then grasps tube 24 with one hand and simultaneously pulls tube 24 inwardly while pushing mounting plate 30 against wall 20. This action forces end assembly 22 and plate 30 tightly against wall 20 to form a tight seal. The user then connects mounting plate 30 securely to the inner end of tube 24 with a fastener to maintain the tight connection. Mounting plate 30 may be connected to the inner end of tube 24 with tape or mechanical fasteners. The user may then fill tube 24 with expanding aerosol insulation to insulate poke through 10. The use of insulation prevents heat from escaping through poke through 10, prevents water from coming into building 14 through poke through 10, and prevents insects and animals from accessing building 14 through poke through 10.

Figure 20:
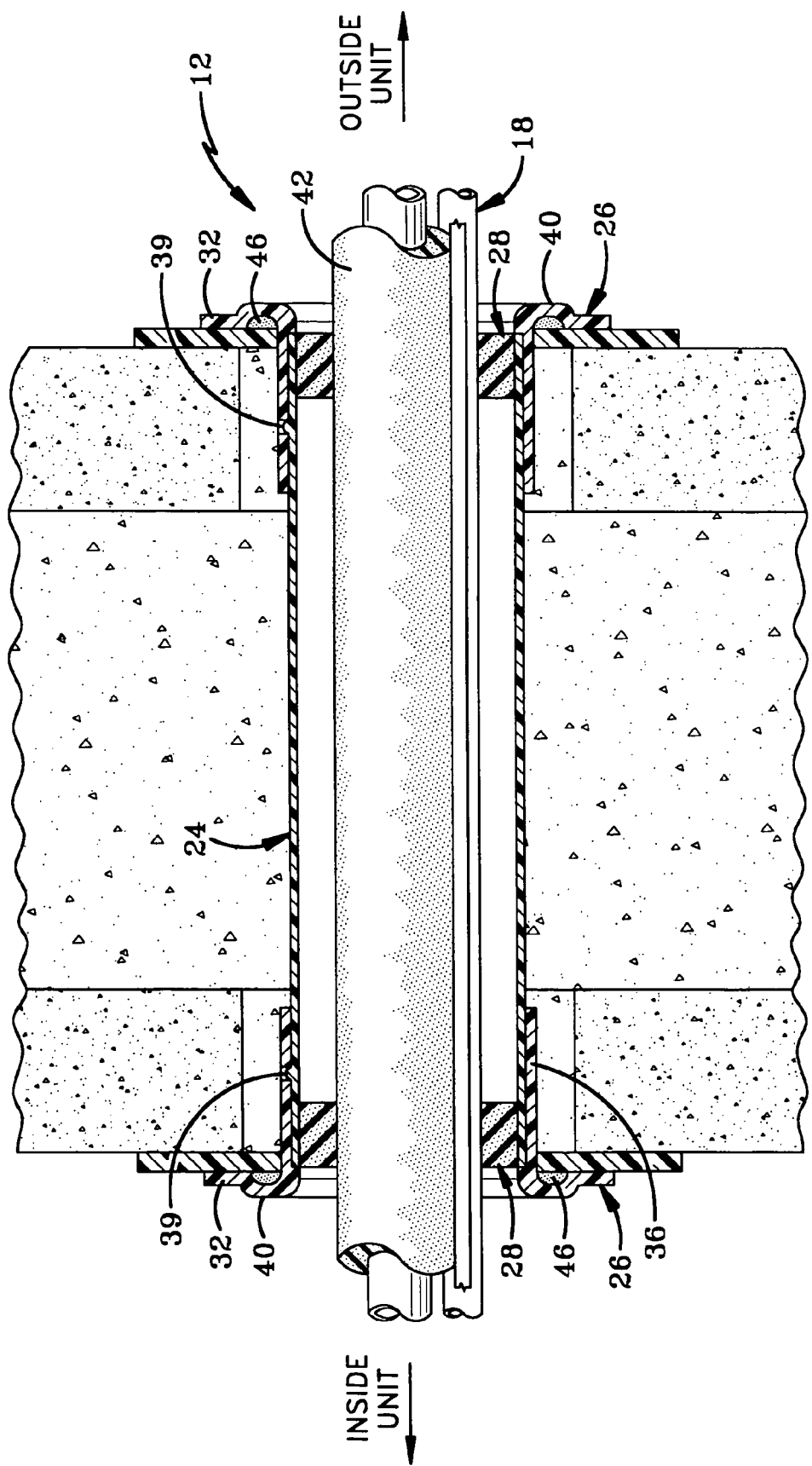

As shown in FIG. 20, tube 24 may be cut to a length that positions end assemblies 22 and 26 directly against wall 20 when tube 24 is connected to both end assemblies 22 and 26. Such connections may be snap fits such as buttons 39. In this embodiment, steps 38 of end assemblies 22 and 26 are configured to be flush with the outer surface of wall 20 (or disposed against plates 30) so that tube 24 may be provided in stock lengths equal to common wall thicknesses or may be cut by the user to a length equal to the thickness of the wall measured by the user.

The user then connects second end assembly 26 to the inner end of tube 24 as depicted in FIG. 13. The user may then fish line set 18 through poke through 10 and place one plug 28 in place. The user may then fill tube 24 with the expanding aerosol insulation to seal poke through 10 and insulate the opening in wall 20. The user then places a second plug 28 at the other end of poke through 10 to complete the installation.

Figure 21:
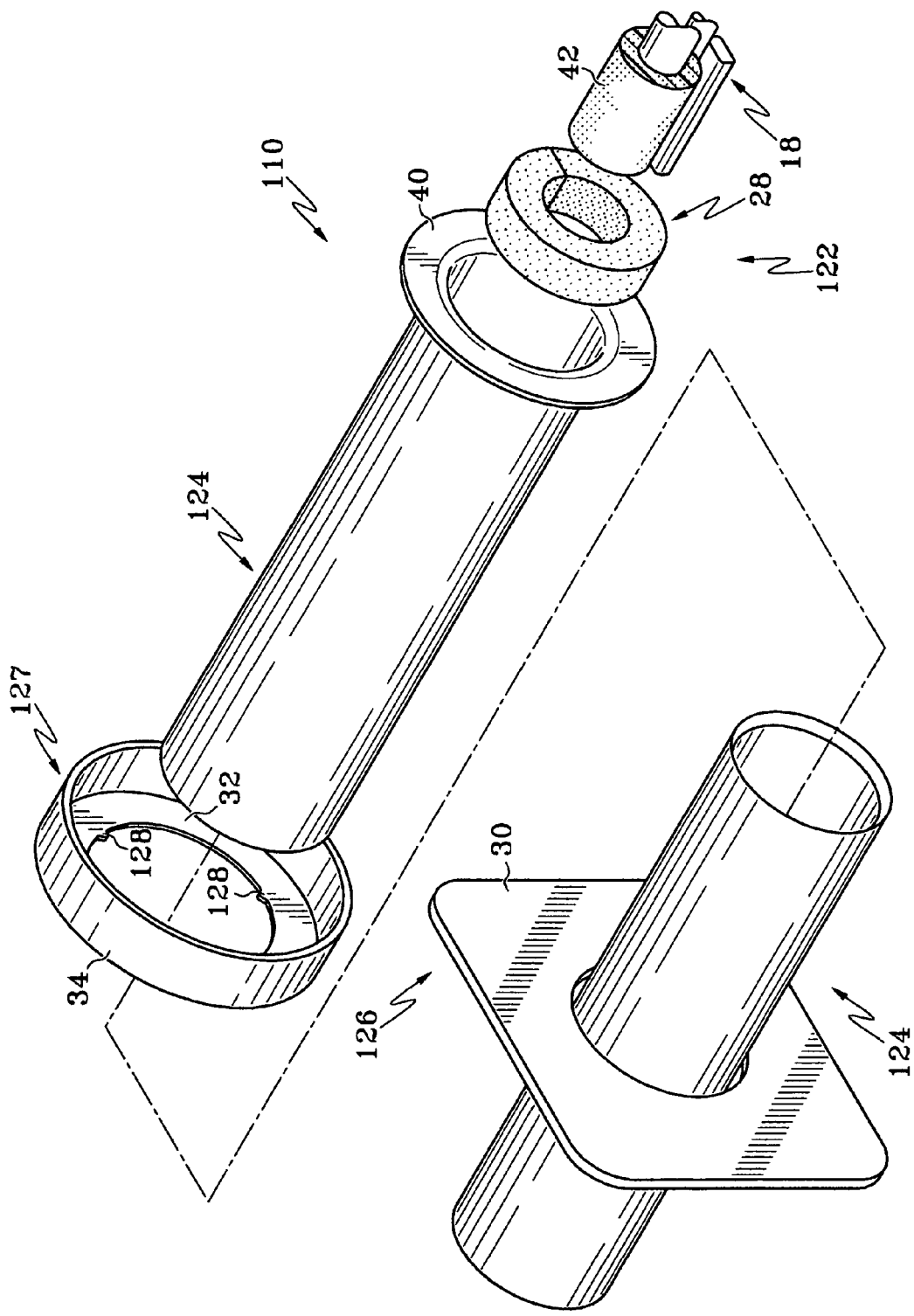
FIG. 21 is an exploded perspective view of a second embodiment of the poke through of the invention.
Figure 22:
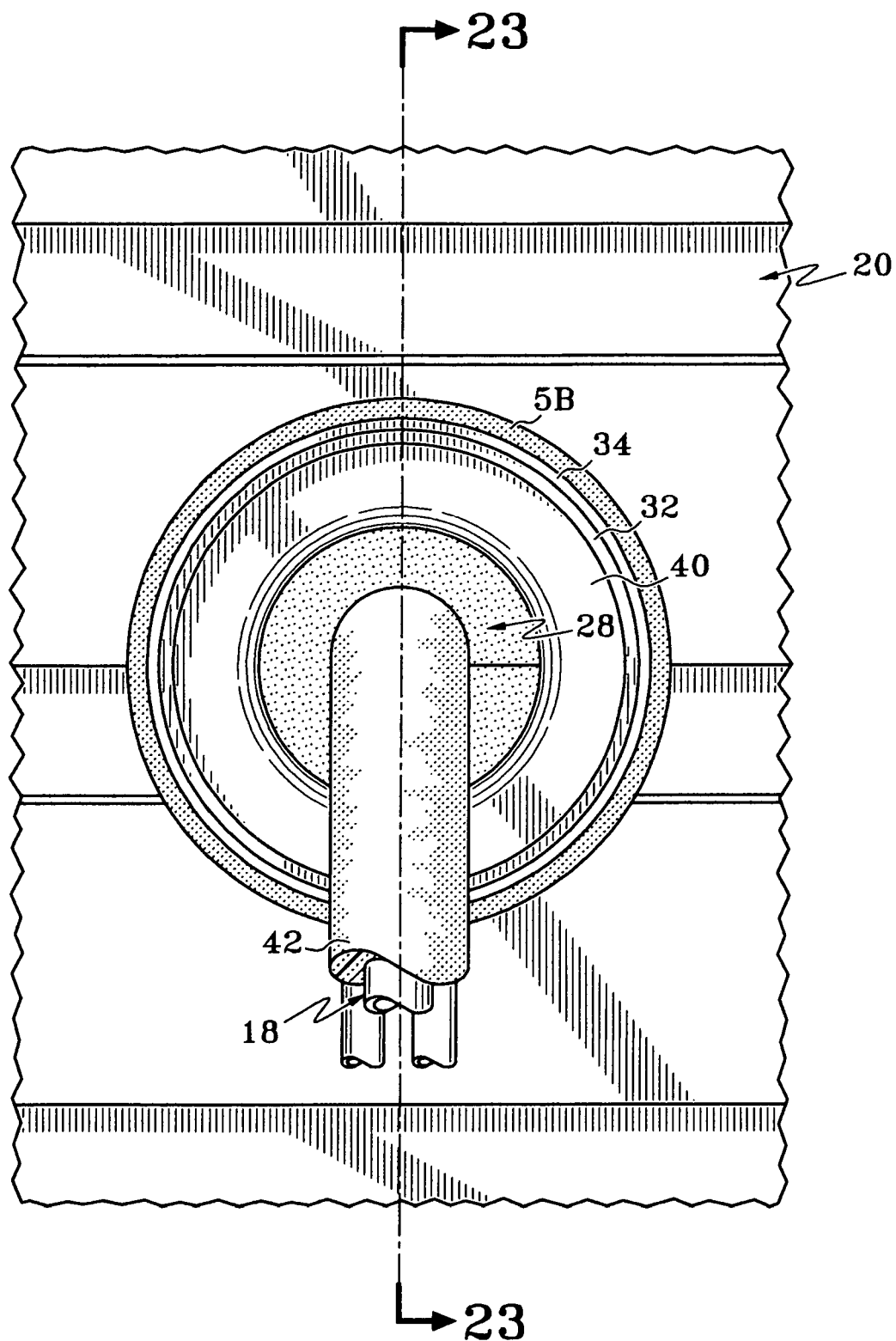
FIG. 22 is a front elevation view of the second embodiment of the poke through installed in a wall wherein the second embodiment of the poke through in used in a first configuration.
Figure 23:
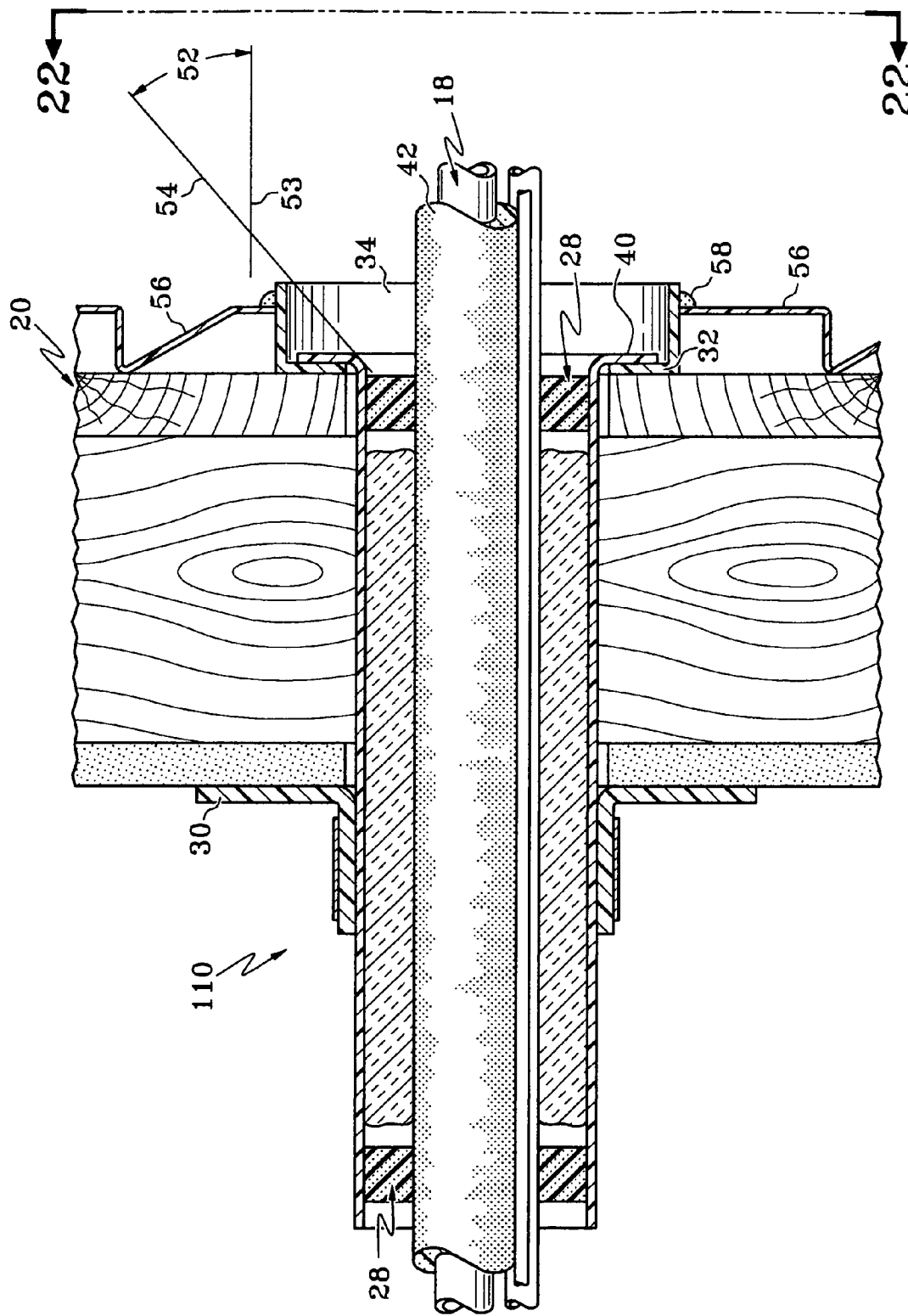
FIG. 23 is a section view taken along line 23—23 of FIG. 22.
Figure 24:
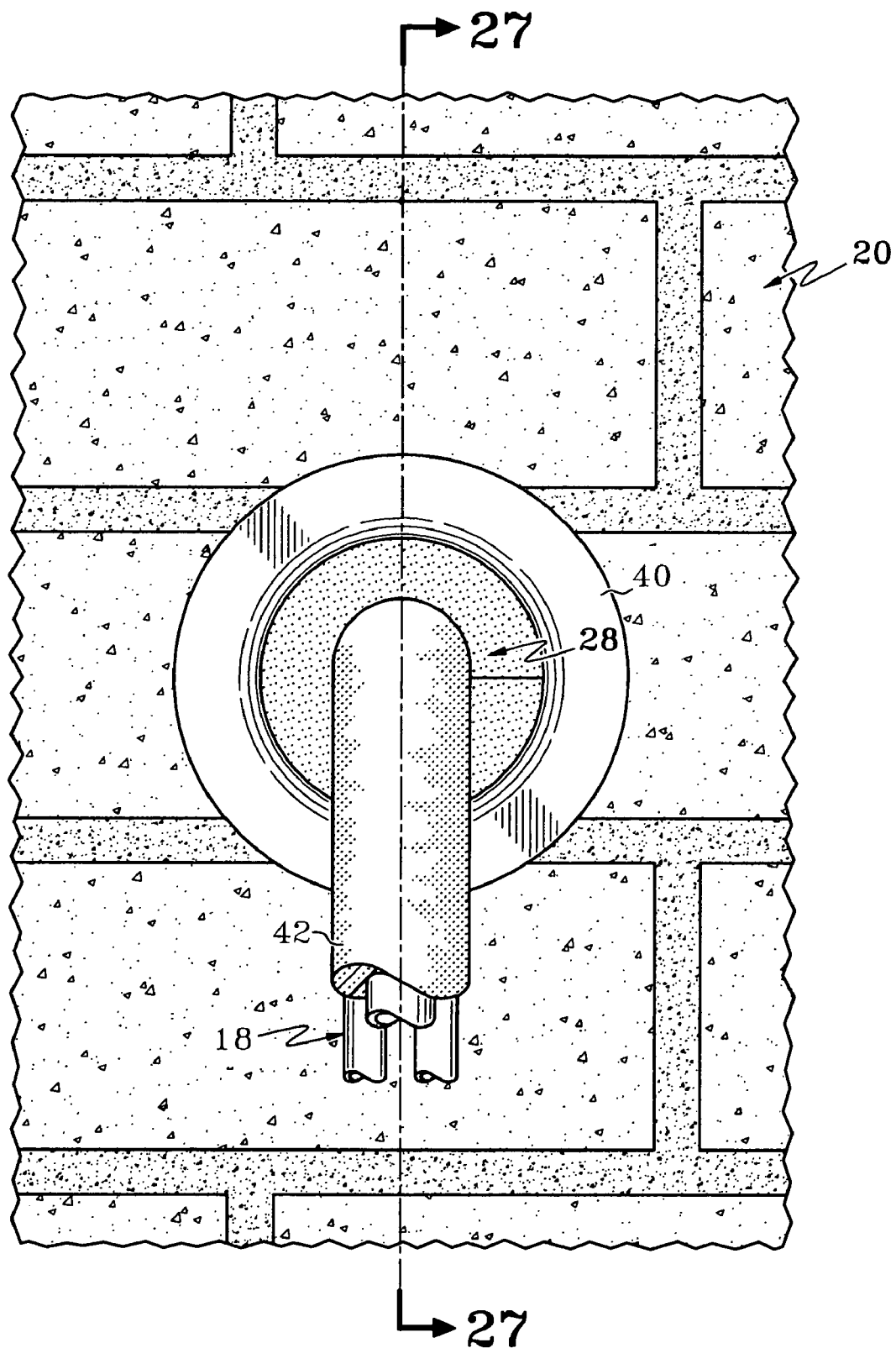
FIG. 24 is a front elevation view of the second embodiment of the poke through installed in a wall wherein the second embodiment of the poke through in used in a second configuration.
Figure 25:
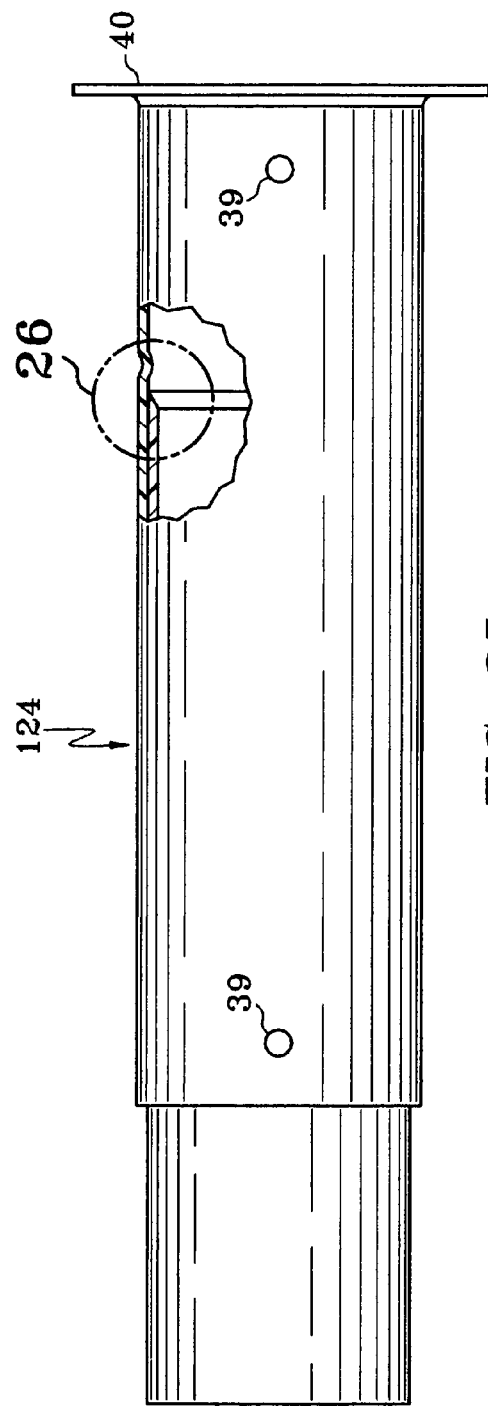
FIG. 25 is a side elevation view of the tube of the second embodiment with a portion depicted in section.
Figure 26:
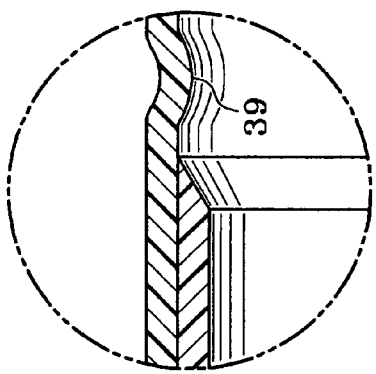
FIG. 26 is an enlarged section view of the encircled portion of FIG. 25.
Figure 27:
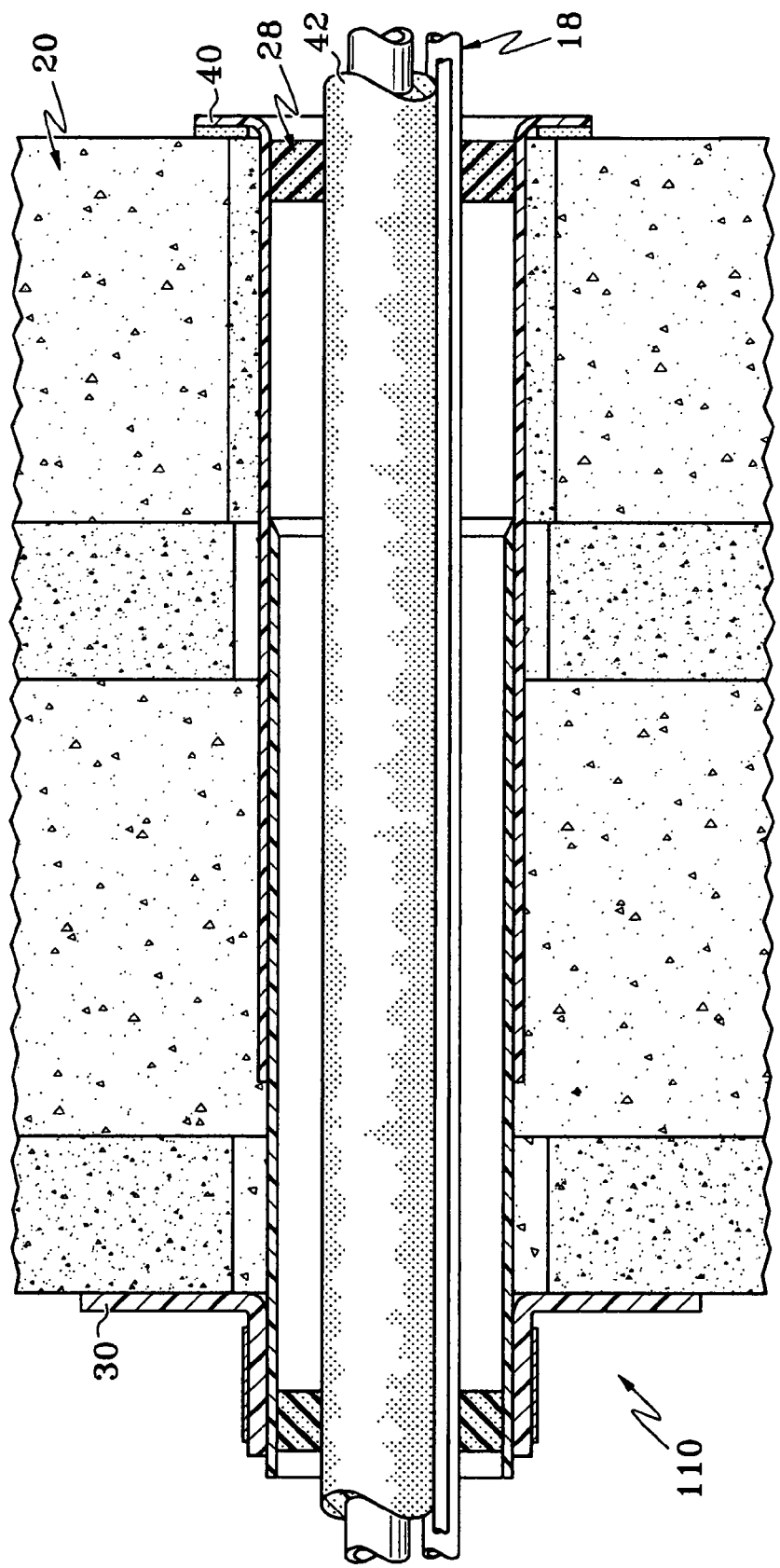
FIG. 27 is a section view taken along line 27—27 of FIG. 24.

A second embodiment of the poke through of the invention is generally indicated by the numeral 110 in FIGS. 21–27. An exploded view of poke through 110 is depicted in FIG. 21. Poke through 110 includes a first end assembly 122, an adjustable, telescoping tube assembly 124, and a second end assembly 126. Tube assembly 124 includes inner and outer tube sections that slide together telescopically so that the length of poke through 110 may be adjusted by the person installing the unit. In one embodiment, the outer tube section of tube assembly 124 includes a pair of longitudinally-spaced protrusions 39 that frictionally engage the inner tube to maintain the relative positions of the tube sections. A pair of protrusions 39 are used so that the tube sections may be cut shorter for used with thin walls. When poke through 110 is used with a thin wall, one of the protrusions is cut away and tube assembly 124 is used with a single protrusion. FIG. 26 shows one embodiment wherein the inner end of the inner tube section is tapered. The elements of assemblies 122 and 126 described below may be integrally formed or formed in individual components. Poke through 110 may also include a plug 28. Poke through 110 may be assembled in at least two configurations as shown in FIGS. 23 and 27. Either configuration may be positioned horizontally or vertically (or another angle) with respect to the structure in which it is used. The exemplary drawings show the poke through being used with a vertical wall but it may also be used with a horizontal floor.

The structure of first end assembly 122 is shown in FIGS. 21–23. Second end assembly 126 is shown in FIGS. 23 and 27. First end assembly 122 includes a cup 127 that includes a body plate 32 with an outer flange 34 projecting outwardly and forwardly (forward with respect to the structure in which it will be used) from the outer perimeter of body plate 32. Cup 127 is removable from tube assembly 124 so that poke through 110 may be used with sided walls as shown in FIG. 23 or masonry walls as shown in FIG. 27. At least one, but preferably at least three fingers 128, project inwardly from body plate 32. Fingers 128 are configured to create a frictional restraining force between cup 127 and tube 124. As described above, end assembly 122 may be fastened to wall 20 with adhesives or mechanical fasteners 48 such as nails, wood screws, or masonry screws. Body plate 32 may define notches or holes 50 that help start fasteners 48.

A smooth lip 40 projects forwardly and outwardly from the front of tube assembly 124. Lip 40 provides a smooth, rounded corner over which line set 18 may be pulled when a worker is fishing line set 18 through poke through 110. Lip 40 is continuous and is free of sharp edges or corners that would snag the insulation 42 of line set 18. Lip 40 has an outer diameter larger than the opening defined by body plate 32 so that lip 40 firmly seats against the front surface of body plate 32 when cup 127 is slid onto tube assembly 124.

Outer flange 34 extends substantially perpendicularly to body plate 32 and is continuous about the outer perimeter of first end assembly 22. Outer flange 34 has a height that is short enough to not interfere with line set 18 when line set 18 is being pulled through, or pushed through, first end assembly 22. In order to avoid interference, the height of outer flange 34 is designed such that an acute angle 52 of greater than 40 degrees is formed between a longitudinal reference line 53 and a reference line 54 as shown in FIG. 13. Reference line 53 is parallel to the longitudinal axis of flange 36. Reference line 54 is tangent to lip 40 and passes through the inner portion of the outer edge of flange 34. However, flange 34 must have a height that is large enough to extend past siding 56 disposed on the outside of wall 20. As such, outer flange 34 has a height of at least one inch or 2.54 cm. When first end assembly 22 is installed on a sided wall 20, siding 56 is cut to allow a space for first end assembly 22. The opening cut in siding 56 snugly receives first end assembly 22 to provide a desirable appearance and to stop water from directly attacking wall 20. A bead of sealant 58 may be used to seal the connection between siding 56 and flange 34.

Plug 28 is used inside tube assembly 124 to help seal the space around line set 18 as shown in FIGS. 22 and 23. Plug 28 is preferably fabricated from an insulating material such as a foamed polymer. Plug 28 is generally C-shaped including a longitudinal slit that extends from the interior opening to the exterior opening. The slit allows plug 28 to be opened and stretched around line set 18 so that it may be installed. Plug 28 is then slid into place where it is frictionally received within tube 124. FIG. 23 shows that the interior of tube assembly 124 may be filled with an insulating material such as expanding aerosol insulation. One benefit to using plug 28 is a smooth, aesthetically-pleasing appearance to the exterior of poke through 10. The color of plug 28 may also be matched to the color of first end assembly 22 as well as siding 56 in order to help hide poke through 10. Another benefit is that plug 28 may be used to seal the through after the poke through is installed in a wall but before the lines or wires are run. When such a seal is desired, the interior opening of plug 28 may be filled with a removable filler plug such as that shown in FIG. 28. FIG. 28 also depicts a plug having outer and inner dimensions that are adjustable by the person installing plug 28. Both the exterior and interior dimensions may be changed by the user by selectively removing concentric layers.

Second end assembly 126 includes mounting plate 30 and the fastener that connects mounting plate 30 to tube assembly 124. Mounting plate 30 may include legs that are bent parallel to and are disposed against the outer surface of tube assembly 124. These legs are then fastened to tube section 124 with a fastener as discussed above.

Figure 28A:
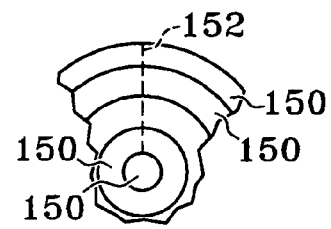
FIG. 28A shows alternative slits for the plug.

An alternative plug 28 is depicted in FIG. 28. The plug configuration of FIG. 28 allows plug 28 to be sized for different tubes and for different lines 18 running through the tubes. Plug 28 is preferably at least 1 inch thick so that it remains stable and self-supported within the tube. Plug 28 includes a plurality of concentric rings 150 that may be selectively added or removed from plug to configure the plug in a desirable configuration. The center ring is a solid core that is used to plug the poke through before the lines are installed. The body of the plug is formed from a flexible insulating material such as a foamed polymer. This material allows the plug to be deformed to fit the opening in which it is being inserted. A slit 152 is formed through most of the thickness of the body of plug 28. Slit 152 allows the user to selectively remove rings 150. The integrity of the body of plug 28 is maintained because slit 152 does not pass all the way through the body of body 28. In another embodiment shown in FIG. 28A, slit 152 extends entirely through the body of plug 28 but not entirely though each ring 150.

Figure 29:
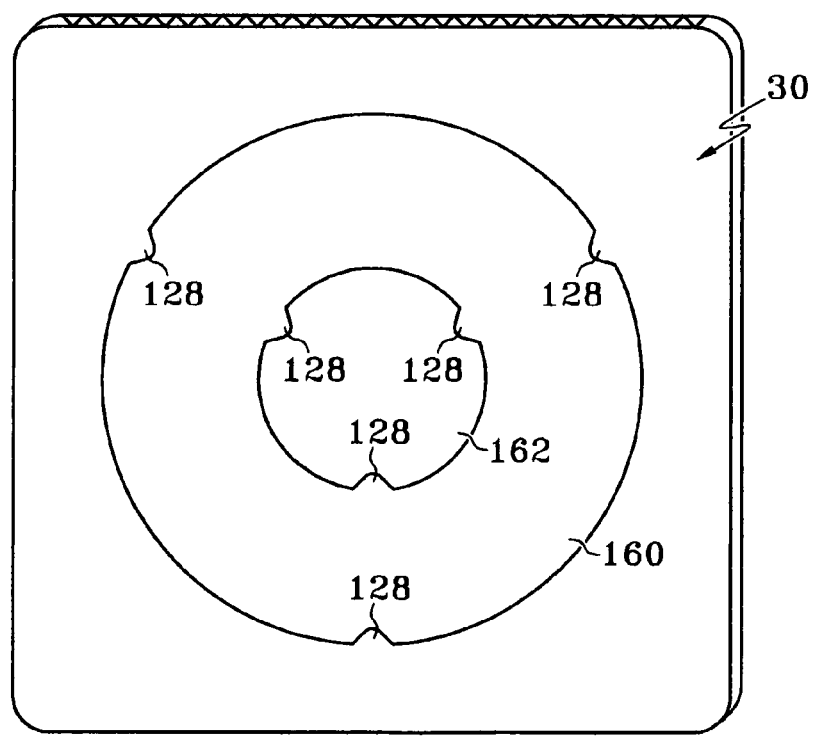
FIG. 29 is a front view of an alternative mounting plate 30 that may be adjusted for different size tubes.

FIG. 29 depicts an alternative embodiment of mounting plate 30 that may be selectively configured to work with different sized tubes. Mounting plate 30 may be formed from a sheet of corrugated polymer. At least two perforated or slit rings 160 and 162 are formed in the sheet of material sized for large and small tubes. Fingers 128 project inwardly from each ring 160 and 162 for frictional engagement with the outer surface of the tubes.

Figure 30:
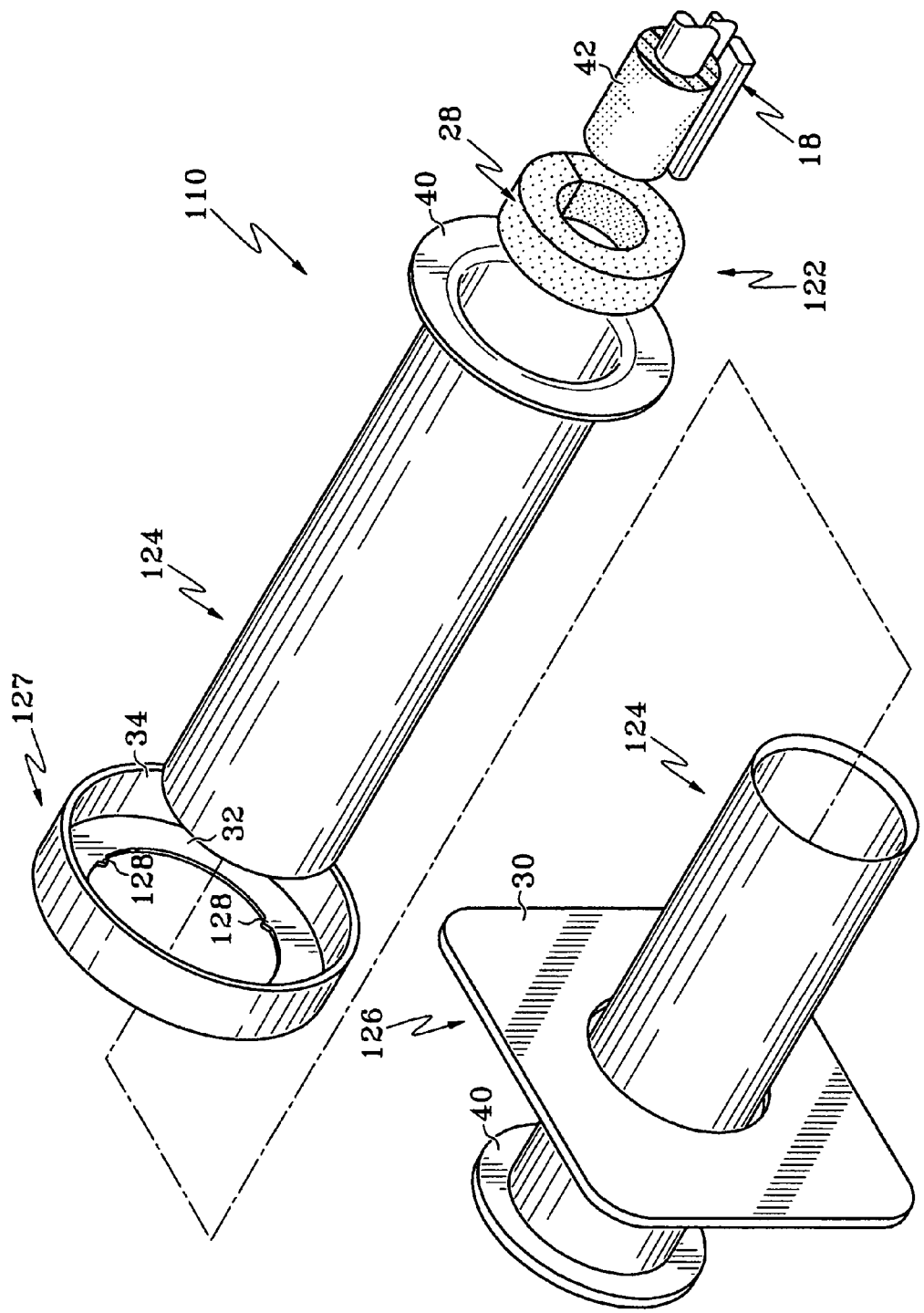
FIG. 30 shows an alternative configuration for the second embodiment wherein both tube sections have lip 40 projecting from their outer ends.

FIG. 30 shows an alternative configuration for the second embodiment wherein both tube sections have lip 40 projecting from their outer ends. In this configuration, the lip of the inner tube section presses mounting plate 30 against the inner surface of wall 20.

In the foregoing description, certain terms have been used for brevity, clearness, and understanding. No unnecessary limitations are to be implied therefrom beyond the requirement of the prior art because such terms are used for descriptive purposes and are intended to be broadly construed. For example, each of the embodiments described above may be provided in different sizes and shapes as need for a particular application. For example, the tube sections described above (round or rectangular) may be sized to work with a standard building block or brick so that they may be easily installed in masonry walls without difficulty. Moreover, the description and illustration of the invention is an example and the invention is not limited to the exact details shown or described.

What is claimed is:

1. A poke through, comprising:
   a tube assembly having inner and outer tube sections; each of the inner and outer tube sections having inner and outer ends;
   the tube assembly having a longitudinal axis;
   the tube sections slidably disposed together telescopically along the longitudinal axis;
   a lip protruding from the outer end of each tube section; the lip protruding in a direction substantially perpendicular to the longitudinal axis of the tube assembly;
   a cup disposed on one of the tube sections; the cup having a body plate and a flange; the body plate having an inner edge that defines an opening through which a portion of one of the tube sections is disposed; and
   a portion of the lip on the tube section on which the cup is disposed engaging the front surface of the body plate.

2. The poke through of claim 1, wherein at least one of the tube sections includes a protuberance that frictionally engages the other of the tube sections.

3. The poke through of claim 2, wherein the outer tube section includes a pair of longitudinally-spaced protuberances; one of the two protuberances frictionally engaging the inner tube section.

4. The poke through of claim 3, wherein one of the protuberances is disposed adjacent the inner end of the outer tube section and one of the protuberances is disposed adjacent to outer end of the outer tube section.

5. The poke through of claim 1, wherein the flange is disposed parallel to longitudinal axis of the tube assembly.

6. The poke through of claim 5, wherein the flange is cylindrical.

7. The poke through of claim 6, wherein the lip is continuous.

8. The poke through of claim 7, wherein the lip is smooth and rounded.

9. The poke through of claim 1, further comprising a plug configured to be frictionally received in one of the tube sections.

10. The poke through of claim 9, wherein the plug is deformable so that it may be fit into either of the tube sections.

11. The poke through of claim 10, wherein the plug is fabricated from a foamed polymer.

12. The poke through of claim 1, further comprising a mounting plate disposed on the tube section that does not carry the cup.

13. The poke through of claim 1, wherein the flange has an outer end; a first reference line being disposed tangent to the lip and passes through the outer end of the flange; an acute angle between the first reference line and a reference line disposed parallel to longitudinal axis being greater than 40 degrees.

14. The poke through of claim 13, wherein the flange is at least one inch long.

15. A poke through, comprising:
a tube assembly having inner and outer tube sections; each of the inner and outer tube sections having inner and outer ends;
the tube assembly having a longitudinal axis;
the tube sections slidably disposed together telescopically along the longitudinal axis;
a lip protruding from the outer end of one of the tube sections;
a cup selectively and removably disposed on one of the tube sections; the cup having a body plate and a flange; the body plate having an inner edge that defines an opening through which a portion of one of the tube sections is disposed;
a portion of the lip on the tube section on which the cup is disposed engaging the front surface of the body plate; and
an adjustable plug having a plurality of selectively removable rings; the adjustable plug fitting inside one of the tube sections.

16. The poke through of claim 15, wherein the plug is formed from a deformable foamed polymer.

17. The poke through of claim 16, wherein each of the rings is partially slit to allow a user to separate the ring from the plug.

18. The poke through of claim 15, wherein the flange has an outer end; a first reference line being disposed tangent to the lip and passes through the outer end of the flange; an acute angle between the first reference line and a reference line disposed parallel to longitudinal axis being greater than 40 degrees.

19. A poke through, comprising:
a tube assembly having inner and outer tube sections; each of the inner and outer tube sections having inner and outer ends;
the tube assembly having a longitudinal axis;
the tube sections slidably disposed together telescopically along the longitudinal axis;
the outer tube section including a pair of longitudinally-spaced protuberances; one of the two protuberances frictionally engaging the inner tube section;
a lip protruding from the outer end of each of the tube sections; the lip protruding in a direction substantially perpendicular to the longitudinal axis of the tube assembly;
a cup selectively and removably disposed on the outer tube section; the cup having a body plate and a flange; the body plate having an inner edge that defines an opening through which a portion of the outer tube section is disposed;
a portion of the lip on the tube section on which the cup is disposed engaging the front surface of the body plate; and
an adjustable plug having a plurality of selectively removable rings; the adjustable plug fitting inside one of the tube sections; the plug being formed from a deformable foamed polymer; each of the rings being partially slit to allow a user to separate the ring from the plug.

20. The poke through of claim 19, further comprising a mounting plate connected to the inner tube section.

21. The poke through of claim 20, wherein the mounting plate includes a plurality of fingers that frictionally engage the inner tube section.

22. The poke through of claim 19, wherein the flange has an outer end; a first reference line being disposed tangent to the lip and passes through the outer end of the flange; an acute angle between the first reference line and a reference line disposed parallel to longitudinal axis being greater than 40 degrees.

* * * * *